United States Patent
Takada et al.

(10) Patent No.: US 9,868,472 B2
(45) Date of Patent: Jan. 16, 2018

(54) BONNET STRUCTURE OF AUTOMOTIVE VEHICLE

(71) Applicant: MAZDA MOTOR CORPORATION, Hiroshima (JP)

(72) Inventors: Kohji Takada, Hiroshima (JP); Kozo Ishizuka, Hiroshima (JP); Hirokazu Yamauchi, Hiroshima (JP); Akira Miyake, Hiroshima (JP); Yousuke Inamitsu, Hiroshima (JP); Hideaki Fujii, Higashihiroshima (JP); Takashi Hamada, Hiroshima (JP); Soukichi Kikuchi, Higashihiroshima (JP); Atsushi Koriyama, Hiroshima (JP); Tsuyoshi Nishihara, Aki-gun (JP); Izumi Sadanaga, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 213 days.

(21) Appl. No.: 14/826,726

(22) Filed: Aug. 14, 2015

(65) Prior Publication Data
US 2016/0083019 A1 Mar. 24, 2016

(30) Foreign Application Priority Data

Sep. 19, 2014 (JP) .................................. 2014-190691
Sep. 19, 2014 (JP) .................................. 2014-190692
(Continued)

(51) Int. Cl.
*B62D 25/12* (2006.01)
*B62D 25/10* (2006.01)
*B60R 21/34* (2011.01)

(52) U.S. Cl.
CPC .............. *B62D 25/12* (2013.01); *B60R 21/34* (2013.01); *B62D 25/105* (2013.01); *B60R 2021/343* (2013.01)

(58) Field of Classification Search
CPC ........ B62D 25/10; B62D 25/12; B62D 25/105; B60R 21/34; B60R 2021/343
(Continued)

(56) References Cited

U.S. PATENT DOCUMENTS 7,578,548 B2 * 8/2009 Behr ....................... B60R 21/34
180/69.2
7,631,928 B2 * 12/2009 Ackland .............. B62D 25/105
296/193.11
(Continued)

FOREIGN PATENT DOCUMENTS

JP S62-068180 A 3/1987
JP S63-87186 U 6/1988
(Continued)

*Primary Examiner* — H Gutman
(74) *Attorney, Agent, or Firm* — Studebaker & Brackett PC

(57) ABSTRACT

A bonnet inner panel includes a central protrusion portion protruding upward in a vehicle elevational view and a rear protrusion portion located in back of the central protrusion portion, which are arranged side by side in a vehicle longitudinal direction, a deep-drawn groove is provided between the both protrusion portions to extend in a vehicle width direction, and a hinge reinforcement is provided to extend from a position beside the rear protrusion portion to a position at a rear end of the central protrusion portion, passing through beside the deep-drawn groove. Thereby, the hinge support rigidity of the rear portion of the bonnet having the central protrusion portion can be increased, so that occurrence of any improper deflection or vibration
(Continued)

caused to the bonnet by the traveling vibration, the traveling-air pressure or the like can be prevented.

20 Claims, 13 Drawing Sheets

(30) Foreign Application Priority Data

Sep. 19, 2014 (JP) .................................. 2014-190693
Sep. 19, 2014 (JP) .................................. 2014-190694
Sep. 19, 2014 (JP) .................................. 2014-190695

(58) Field of Classification Search
USPC ..................................................... 296/193.11
See application file for complete search history.

(56) References Cited

U.S. PATENT DOCUMENTS

| | | | | |
|---|---|---|---|---|
| 9,027,987 B2 * | 5/2015 | Ikeda | ..................... | B62D 25/12 |
| | | | | 296/193.11 |
| 9,033,407 B2 * | 5/2015 | Ikeda | ..................... | B60R 21/34 |
| | | | | 296/187.04 |
| 9,150,256 B2 * | 10/2015 | Yonezawa | ............... | B60R 21/34 |
| 9,387,887 B2 * | 7/2016 | Ishitobi | ................ | B62D 25/105 |
| 9,533,715 B2 * | 1/2017 | Inoue | .................... | B62D 25/105 |
| 2004/0021342 A1 | 2/2004 | Fujimoto | | |
| 2005/0082874 A1 * | 4/2005 | Ikeda | ...................... | B60R 21/34 |
| | | | | 296/193.11 |
| 2011/0169303 A1 * | 7/2011 | Ikeda | ...................... | B60R 21/34 |
| | | | | 296/193.11 |
| 2012/0217761 A1 * | 8/2012 | Nakamura | ........... | B62D 25/105 |
| | | | | 292/97 |

FOREIGN PATENT DOCUMENTS

| | | |
|---|---|---|
| JP | H1-144280 U | 10/1989 |
| JP | H11-321714 A | 11/1999 |
| JP | 2003-205866 A | 7/2003 |
| JP | 2005-145224 A | 6/2005 |
| JP | 2005-239092 A | 9/2005 |
| JP | 2007-308111 A | 11/2007 |
| JP | 2008-238919 A | 10/2008 |
| JP | 2009-035088 A | 2/2009 |
| JP | 2009-137525 A | 6/2009 |
| JP | 2010-208556 A | 9/2010 |
| JP | 2011-213283 A | 10/2011 |
| JP | 2012-210890 A | 11/2012 |
| JP | 2012-214076 A | 11/2012 |
| JP | 2013-230776 A | 11/2013 |
| JP | 2015-151054 A | 8/2015 |

* cited by examiner

BONNET STRUCTURE OF AUTOMOTIVE VEHICLE

BACKGROUND OF THE INVENTION

The present invention relates to a bonnet structure of an automotive vehicle, in which a rear portion of a bonnet including a bonnet outer panel and a bonnet inner panel is pivotally supported at a vehicle body via a hinge.

In general, a bonnet (which is alternatively called an engine hood) of an automotive vehicle comprises a bonnet outer panel and a bonnet inner panel, and a rear portion of the bonnet is pivotally supported at a vehicle body so that the bonnet can open or close an engine room. The bonnet is needed to satisfy some requirements that the bonnet is properly supported at the vehicle body such that no deflection or vibration is caused to the bonnet by traveling vibration, traveling-air pressure or the like, a rear end of the bonnet does not retreat (moves backward) via a hinge in a vehicle (frontal) collision, impact energy occurring when the vehicle collides with a collision object, such as a pedestrian, can be absorbed properly, and so on.

Conventionally, it is known that a central protrusion portion which protrudes upward is provided at a central portion of the bonnet inner panel for the purpose of absorbing the impact energy in a collision with the collision object.

A conventional structure disclosed in Japanese Patent Laid-Open Publication No. 2012-210890 is configured such that a central protrusion portion which has plural uneven portions extending in a vehicle width direction is integrally formed at a central portion of a bonnet inner panel, a ring-shaped groove enclosing front, rear, right and left sides of the central protrusion portion is provided to ensure the bonnet rigidity, and a bonnet's rear portion is supported at a vehicle body via a hinge. There is room for improvement on increasing the hinge support rigidity of the bonnet's rear portion for the conventional structure disclosed in the above-descried patent document.

Another conventional structure disclosed in Japanese Patent Laid-Open Publication No. 2011-213283 is configured such that a central protrusion portion which has plural uneven portions extending longitudinally is provided at a central portion of a bonnet inner panel, and a hinge reinforcement which extends from a rear end of a side portion of the bonnet inner panel to the central protrusion portion is provided.

The conventional structure disclosed in the above-described patent document increases the hinge support rigidity of the bonnet's rear portion by the hinge reinforcement only, not by the structure of the bonnet inner panel itself.

Any of the structures disclosed in Japanese Patent Laid-Open Publication Nos. 2008-238919, 2009-35088, 2009-137525, 2010-208556, and 2012-214076 does not effectively increase the hinge support rigidity of the bonnet's rear portion.

SUMMARY OF THE INVENTION

Accordingly, an object of the present invention is to provide a bonnet structure of an automotive vehicle which can properly increase the hinge support rigidity of the rear portion of the bonnet having the central protrusion portion, thereby preventing the occurrence of any improper deflection or vibration caused to the bonnet by the traveling vibration, the traveling-air pressure or the like.

The present invention is a bonnet structure of an automotive vehicle, in which a rear portion of a bonnet including a bonnet outer panel and a bonnet inner panel is pivotally supported at a vehicle body via a hinge, wherein the bonnet inner panel includes a central protrusion portion protruding upward in a vehicle elevational view and a rear protrusion portion located in back of the central protrusion portion, which are arranged side by side in a vehicle longitudinal direction, a deep-drawn groove is provided between the central protrusion portion and the rear protrusion portion to extend in a vehicle width direction, and a hinge reinforcement is provided to extend from a position beside the rear protrusion portion to a position at a rear end of the central protrusion portion, passing through beside the deep-drawn groove. Herein, the above-described deep-drawn groove can be formed in a recess shape having a deep depth through plural-time pressing (press processing).

According to the present invention, the vertical-bending rigidity of a central portion, in the vehicle width direction, of the bonnet can be increased by the deep-drawn groove provided to extend in the vehicle width direction between the right-and-left hinge reinforcements which is provided to extend from the position beside the rear protrusion portion to the position at the rear end of the central protrusion portion, passing through beside the deep-drawn groove. Further, the rigidity can be properly increased so as to prevent any mouth-opening deformation of the deep-drawn groove or vertical-bending deformation of the bonnet's rear portion. That is, the hinge support rigidity of the rear portion of the bonnet having the central protrusion portion can be properly increased, so that the occurrence of any improper deflection or vibration caused to the bonnet by the traveling vibration, the traveling-air pressure or the like can be properly prevented.

In an embodiment of the present invention, the deep-drawn groove curves such that a central portion, in the vehicle width direction, thereof protrudes forward, in a plan view, to a position forward of a front end of the hinge reinforcement. According to this embodiment, the hinge support rigidity can be increased over a range to the position forward of the front end of the hinge reinforcement by the above-described curve structure of the deep-drawn groove, and the rigidity against the mouth-opening deformation of the deep-drawn groove can be also increased by this curve structure.

In another embodiment of the present invention, a pair of the side grooves depressed downward are provided to extend in the vehicle longitudinal direction at both right-and-left side portions of the bonnet inner panel, and the hinge reinforcement is fixed to a portion of the bonnet inner panel beside the side groove at a level located below the deep-drawn groove. According to this embodiment, the deep-drawn groove and the rear protrusion portion can be strengthened by the above-descried side grooves, and since the hinge reinforcement is fixed at the level below the deep-drawn groove, a crush space for damping of an impactor located above the hinge reinforcement can be enlarged.

In another embodiment of the present invention, a lock portion to be engaged with a vehicle-body side is provided at a front portion of the bonnet, a ridge-holding starting point to promote an upward bending is provided at a portion of the bonnet inner panel between the lock portion and the hinge reinforcement, and a reinforcement portion which is configured to extend in the vehicle width direction and deform downward when receiving an input load greater than a longitudinal-direction proof stress thereof and a front end of the hinge reinforcement are arranged side by side in the vehicle width direction at a position rearward of the ridge-holding starting point. According to this embodiment, since the reinforcement portion (rigidity changing point) and the front end of the hinge reinforcement (rigidity changing point) are arranged side by side in the vehicle width direction, the bending rigidity of the bonnet's rear portion and the hinge support rigidity in a normal state can be properly increased. Further, since the stress concenters on these rigidity changing points in a vehicle frontal collision, the reinforcement portion and the front end of the hinge reinforcement deform downward (downward holding, valley holding). Accordingly, a bending moment to press the hinge against the vehicle body is generated, so that the downward-holding deformation can be promoted and the load dispersion can be attained. That is, both ensuring the hinge support rigidity of the bonnet and preventing the bonnet's rear portion from retreating in the vehicle frontal collision can be attained.

In another embodiment of the present invention, the reinforcement portion is formed by the deep-drawn groove, and the hinge reinforcement extends to a position at a front edge of the deep-drawn groove. According to this embodiment, reinforcing against the mouth-opening deformation of the deep-drawn groove can be attained by the hinge reinforcement, thereby providing a lightweight and high-rigidity structure. Further, the deep-drawn groove effectively promotes the downward-holding deformation in the vehicle frontal collision and thereby the hinge is pressed against the vehicle body, so that the frontal-collision load can be dispersed properly.

In another embodiment of the present invention, a rear slant face which is configured to slant forward and upward relative to a lower face of a portion of the bonnet inner panel which is located forward of the central protrusion portion is provided at the central protrusion portion, and the front end of the hinge reinforcement is provided at a position which is located forward of a lower edge of the rear slant face and beside or rearward of an upper edge of the rear slant face in the vehicle longitudinal direction. According to this embodiment, the lower edge of the central protrusion portion can be reinforced by the hinge reinforcement, thereby providing the lightweight and high-rigidity structure. Further, the rigidity in the normal state can be also controlled at the position at the front end of the hinge reinforcement.

In another embodiment of the present invention, a frontal-collision load transmission path is provided to extend in the vehicle longitudinal direction at a level located above the hinge reinforcement relative to the reinforcement portion. Herein, the above-described frontal-collision load transmission path may be formed by an upper face and a side face of the central protrusion portion. According to this embodiment, since the frontal-collision load transmission path exists above the hinge reinforcement, the load can be surely transmitted rearward in an initial stage of the collision, and the downward-holding deformation can be further surely promoted by the offset distance in a vertical direction provided between the hinge reinforcement and the frontal-collision load transmission path.

In another embodiment of the present invention, the ridge-holding starting point comprises a depression portion which is depressed upward from a lower face of the bonnet inner panel and a first vertical wall which extends upward from the depression portion, and the reinforcement portion is formed by the deep-drawn groove and comprises a recess portion which is recessed downward from an upper face of the bonnet inner panel and a second vertical wall which extends downward from the recess portion. According to this embodiment, the amount (degree) of load-absorption caused by deformation can be increased by the ridge-holding starting point and the deep-drawn groove. Further, the frontal-collision load applied to the hinge reinforcement is dispersed from the hinge reinforcement deforming downward to the vehicle body, so that preventing the bonnet's rear portion from retreating can be further attained. Additionally, the rigidity in the normal state can be properly increased by the above-described second vertical wall.

In another embodiment of the present invention, a striker to be engaged with a vehicle-body side is provided at a front portion of the bonnet, a frame-shaped groove which encloses a front side and right and left sides of three portions of the central protrusion portion, the rear protrusion portion, and the deep-drawn groove in a U shape and has a deeper depth than the deep-drawn groove is provided at the bonnet inner panel, and a stiffener is spaced upward apart from a striker attachment portion and provided to extend between a front slant face of the central protrusion portion and a front end portion of the bonnet inner panel. Herein, the above-described configuration that the frame-shaped groove has the deeper depth than the deep-drawn groove means that a bottom portion of the frame-shaped groove is located at the level below a bottom portion of the deep-drawn groove, and does not mean the depth of these grooves themselves. According to this embodiment, the bonnet rigidity in the vehicle traveling can be properly ensured by the both protrusion portions (the central protrusion portion and the rear protrusion portion), the both grooves (the deep-drawn groove and the frame-shaped groove), and the stiffener, and also the crush stroke can be properly long, making an inertia mass concentrate on an upper portion of the bonnet as a whole, by the both protrusion portions and the stiffener, so that appropriate reaction characteristics in which a reaction force for the collision load is large in the collision's initial stage but small in the collision's late stage can be provided.

In another embodiment of the present invention, a striker reinforcement of the striker is provided to extend between both sides of the frame-shaped groove at a forward position of the central protrusion portion, being spaced downward apart from the stiffener by a specified distance which is greater than a protrusion height of a rear portion of the central protrusion portion. According to this embodiment, both ensuring the load-deformation stroke (crush stroke) of the central protrusion portion and increasing the rigidity of a front portion of the frame-shaped groove provided around the both protrusion portions can be attained. Specifically, since the striker reinforcement of the striker is provided to extend between the both sides of the frame-shaped groove at the forward position of the central protrusion portion, being spaced downward apart from the stiffener by the specified distance which is greater than the protrusion height of the rear portion of the central protrusion portion, the load deformation of the central protrusion portion is not blocked by interference of the striker reinforcement with the stiffener in the collision, so that the load-deformation stroke of the central protrusion portion can be properly ensured even at a hard portion including the striker reinforcement. That is, since the striker reinforcement of the striker is provided to extend between a front side and a rear side of the frame-shaped groove at the forward position of the central protrusion portion, not contacting the front portion of the bonnet inner panel, the front portion of the bonnet inner panel is configured to have a closed cross section which is formed between the front portion of the bonnet inner panel and the striker reinforcement, so that the rigidity of the front portion of the frame-shaped groove can be properly reinforced. Consequently, the safety of pedestrians against the collision can be improved by ensuring the appropriate load-deformation stroke (crush stroke) of the central protrusion portion, and the rigidity in the normal traveling state can be ensured by increasing of the rigidity of the front portion of the frame-shaped groove, so that both requirements can be satisfied.

In another embodiment of the present invention, a pair of slits configured to cut upper and lower ridgelines of the central protrusion portion and a pole-shaped portion interposed between the pair of slits are provided at a front-side corner portion of the central protrusion portion. According to this embodiment, an increase of resistance of the deformation which is caused by a front-side corner portion of the central protrusion portion is prevented when the collision object, such as the pedestrian, collides from above, whereas the rigidity is ensured in the normal vehicle traveling and the reaction generated in the initial stage of the collision object's collision is improved, so that any improper interference (so-called bottoming) with components having a high rigidity, such as parts equipped in an engine room, a strut tower of a front wheel and the like, can be properly prevented.

In another embodiment of the present invention, a step portion is provided at the forward position of the central protrusion portion, and the slit is configured to cut an inside ridgeline which is formed by providing the step portion at a position closer to a center of the central protrusion portion in a plan view, without cutting an outside ridgeline which is formed by providing the step portion at a position further from the center of the central protrusion portion. According to this embodiment, the rigidity of the portion of the frame-shaped groove of the bonnet inner panel (the frame rigidity) can be ensured, providing the smooth deformation for properly absorbing the impact load. Herein, while the above-described step portion may be formed in a groove shape (recess shape) or in a convex shape for the bottom face of the frame-shaped groove, it is preferable that the step be formed in the groove shape from viewpoints of ensuring the load-absorption deformation stroke because the thickness of the bonnet does not become improperly thick even if the height of the central protrusion portion from the frame-shaped groove is large (high).

In another embodiment of the present invention, a striker to be engaged with a vehicle-body side is provided at a front portion of the bonnet inner panel, at a front slant face of the bonnet inner panel which is located rearward of a striker attachment portion are provided a stiffener joint portion and a pair of first opening portions which are provided at both ends in the vehicle width direction and configured to cut an upper ridgeline of the front slant face, and a second opening portion is provided at a portion of the front slant face which is located between the first opening portion and the stiffener joint portion such that the second opening portion is located downward apart from the upper ridgeline. According to this embodiment, since the second opening portion provided at the front slant face is located downward apart from the upper ridgeline, the stiffener can be supported so as to endure a bonnet-closing load, and the front slant face can be made to have a load-absorption deformation in the collision-object's collision by the first opening portion and the second opening portion.

In another embodiment of the present invention, the second opening portion and the stiffener joint portion are aligned in the vehicle width direction. According to this embodiment, since the second opening portion provided at the portion of the front slant face which is located downward apart from the upper ridgeline is located at the same level as the stiffener joint portion in the front slant face, the holding deformation of the front slant face in the collision-object's collision can be promoted, so that the impact absorption in the collision can be attained properly.

In another embodiment of the present invention, a stiffener provided at the front portion of the bonnet inner panel includes an extension portion which extends in a cantilever shape in the vehicle width direction from the stiffener joint portion to a position where the stiffener overlaps the second opening portion. According to this embodiment, since there is provided the extension portion, the number of stiffener joint portions (leg portions) does not increase improperly, a reinforcing range of the tensile rigidity of the stiffener for a bonnet-closing operation can be enlarged regardless of the shape of the second opening portion. Further, since the extension portion is provided in the cantilever shape, it can be prevented that the reaction of the load-absorption deformation in an area where the second opening portion is provided becomes too low.

In another embodiment of the present invention, the bonnet structure of the automotive vehicle further comprises a striker which is configured to detachably connect a front end of the bonnet to a front end portion of a vehicle body, a striker attachment portion which is provided at an upper face of the bonnet inner panel and to which the striker is attached, and a stiffener which is provided at an upper face of a front end portion of the bonnet inner panel so as to support the bonnet outer panel from below, wherein the stiffener comprises a roughly flat-plate shaped stiffener body portion which is provided above the striker attachment portion with a specified distance, facing the striker attachment portion, and a connection portion which connects the stiffener body portion and the bonnet inner panel, which are formed integrally, the stiffener body portion has a front opening hole and a rear opening hole which are provided to face the striker attachment portion and formed side by side in the vehicle longitudinal direction, a lateral groove portion which is configured to protrude upward or downward and extend in the vehicle width direction between the front opening hole and the rear opening hole, and a pair of longitudinal groove portions which are configured to respectively protrude upward or downward and extend in the vehicle longitudinal direction near both ends, in the vehicle width direction, of the lateral groove portion, and the lateral groove portion is formed in a curve shape such that the lateral groove portion protrudes in the vehicle longitudinal direction in a plan view, and the longitudinal groove portion is formed in a curve shape such that the longitudinal groove portion protrudes in the vehicle width direction in the plan view. Herein, the above-described striker attachment portion can comprise a striker connecting member which is formed separately from the bonnet inner panel, a screw hole formed at the bonnet inner panel, or the like. The above-described stiffener can support the bonnet outer panel via filler, such as urethane foam, or directly with contacting. The above-described front and rear opening portions can be service holes formed at the striker attachment portion, lightening holes for weight reduction, or the like. The above-described lateral groove portion can be formed in a curve shape in which it protrudes forward or rearward in a plan view. The longitudinal groove portion can be formed in a curve shape in which it protrudes outward or inward in the vehicle width direction in the plan view.

According to this embodiment, both the impact absorption of the collision load applied from above and the support rigidity of the bonnet outer panel can be ensured. Specifically, since the lateral and longitudinal groove portions are formed at the stiffener body portion, it can be restrained that the rigidity of a portion of the stiffener body portion near the front opening hole and the rear opening hole decreases improperly. Further, since the lateral and longitudinal groove portions are formed respectively in the curve shape, the rigidity of the stiffener body portion can be properly improved compared to a case in which they are formed in a straight shape. Additionally, since the pair of longitudinal groove portions are provided near the both ends of the lateral groove portion, the portion of the stiffener near the both ends, in the vehicle width direction, of the lateral groove portion can be reinforced. Accordingly, it can be restrained that the stress concentrates on the both ends, in the vehicle width direction, of the lateral groove portion. Thus, even in a case in which the front opening hole and the rear opening hole which are the service holes for the striker attachment portion are formed, for example, the rigidity of the stiffener can be ensured. Thereby, when the collision load is applied from above, it can be prevented that the stiffener is depressed and completely crushed before sufficiently absorbing the collision load. Consequently, both the impact absorption of the collision load applied from above and the support rigidity of the bonnet outer panel can be ensured by the curve-shaped lateral and longitudinal groove portions.

In another embodiment of the present invention, in a case in which the lateral groove portion is formed in the curve shape in which the lateral groove portion protrudes rearward, a front edge of the rear opening hole is formed in a curve shape such that the front edge of the rear opening hole protrudes forward, whereas in a case in which the lateral groove portion is formed in the curve shape in which the lateral groove portion protrudes forward, a rear edge of the front opening hole is formed in a curve shape such that the rear edge of the front opening hole protrudes rearward. According to this embodiment, the deforming of the stiffener body portion can be further restrained. Specifically, in a case in which the lateral groove portion is formed in the curve shape in which the lateral groove portion protrudes rearward and also the front edge of the rear opening hole is formed in the curve shape such that the front edge of the rear opening hole protrudes rearward, for example, the curve shape of the lateral groove portion and the front-edge shape of the rear opening hole are roughly parallel to each other, so that the rigidity of a portion between the rear opening hole and the lateral groove portion tends to become low. Therefore, when the load is applied to this portion between the rear opening hole and the lateral groove portion, the amount of displacement between the rear opening hole and the lateral groove portion becomes so large that the lateral groove portion may have mouth-opening deformation improperly. Further, in the case in which the front edge of the rear opening hole is formed in the curve shape such that the front edge of the rear opening hole protrudes rearward, the curvature of both ends, in the vehicle width direction, of the front edge of the rear opening hole becomes large, so that the stress may concentrate on these both ends improperly. Therefore, in the case in which the lateral groove portion is provided close to the rear opening portion, the stress tends to concentrate on the both ends of the lateral groove portion and the both ends of the front edge of the rear opening hole, so that there is a concern that there may occur cracks when the load is applied from above repeatedly. By contrast, in the case in which the lateral groove portion is formed in the curve shape such that it protrudes rearward and also the front edge of the rear opening hole is formed in the curve shape such that it protrudes forward, the decreasing of the rigidity of the portion of the stiffener between the rear opening hole and the lateral groove portion can be restrained more properly, compared to the case in which the curve shape of the lateral groove portion and the front-edge shape of the rear opening hole are roughly parallel to each other. Moreover, since the front edge of the rear opening hole is formed in the curve shape such that it protrudes forward, the curvature of the both ends of the front edge of the rear opening hole can be properly small. Thereby, it can be restrained that the stress concentrates on the both ends of the front edge of the rear opening hole and also the size of the rear opening hole formed at the stiffener can be larger. Additionally, even in a case in which the lateral groove portion is provided close to the rear opening hole, the front edge of the rear opening portion and the lateral groove portion are located further away from each other on the outward side, in the vehicle width direction, of these. Thereby, it can be restrained even when the load is applied from above repeatedly that the cracks occur from the both ends of the lateral groove portion or the both ends of the front edge in the stiffener. Moreover, since the lateral groove portion is formed in the curve shape such that it protrudes forward and also the rear edge of the front opening hole is formed in the curve shape such that it protrudes rearward, the stiffener can provide similar effects to the above-described effects. Thus, since the front edge of the rear opening hole or the rear edge of the front opening hole and the lateral groove portion are formed in the curve shape, respectively, such that these protrude toward them, facing each other, the deforming of the stiffener body portion can be restrained more.

In another embodiment of the present invention, a width, in the vehicle width direction, of the stiffener body portion is configured to be greater than that of the striker attachment portion, and an outward-side portion of the stiffener body portion which is located on an outward side, in the vehicle width direction, of the longitudinal groove portion is configured in a truss shape by plural roughly-triangular opening holes. According to this embodiment, the stiffener body portion can be properly lightweight, ensuring its size and rigidity which is large enough to support the bonnet outer panel. Further, since the edge shape of the triangular opening hole adjacent to the longitudinal groove portion and the curve shape of the longitudinal groove portion are not roughly parallel to each other, the rigidity of the portion of the stiffener body portion between the triangular opening hole and the longitudinal groove portion can be restrained from decreasing. Accordingly, since the outward-side portion of the stiffener body portion is configured in the truss shape, both the impact absorption of the collision load applied from above and the support rigidity of the bonnet outer panel can be surely ensured.

Other features, aspects, and advantages of the present invention will become apparent from the following description which refers to the accompanying drawings.

DETAILED DESCRIPTION OF THE INVENTION

Figure 1:
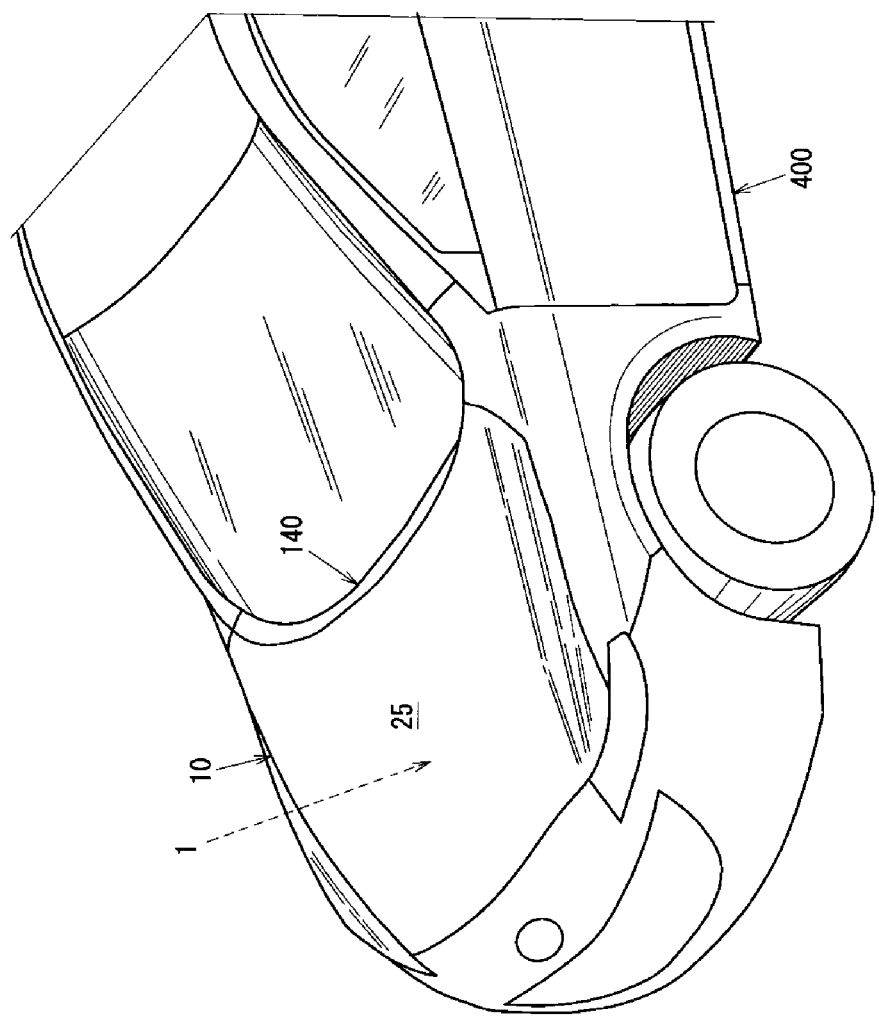
FIG. 1 is a perspective view of a front portion of an automotive vehicle equipped with a bonnet structure of the present invention.
Figure 2:
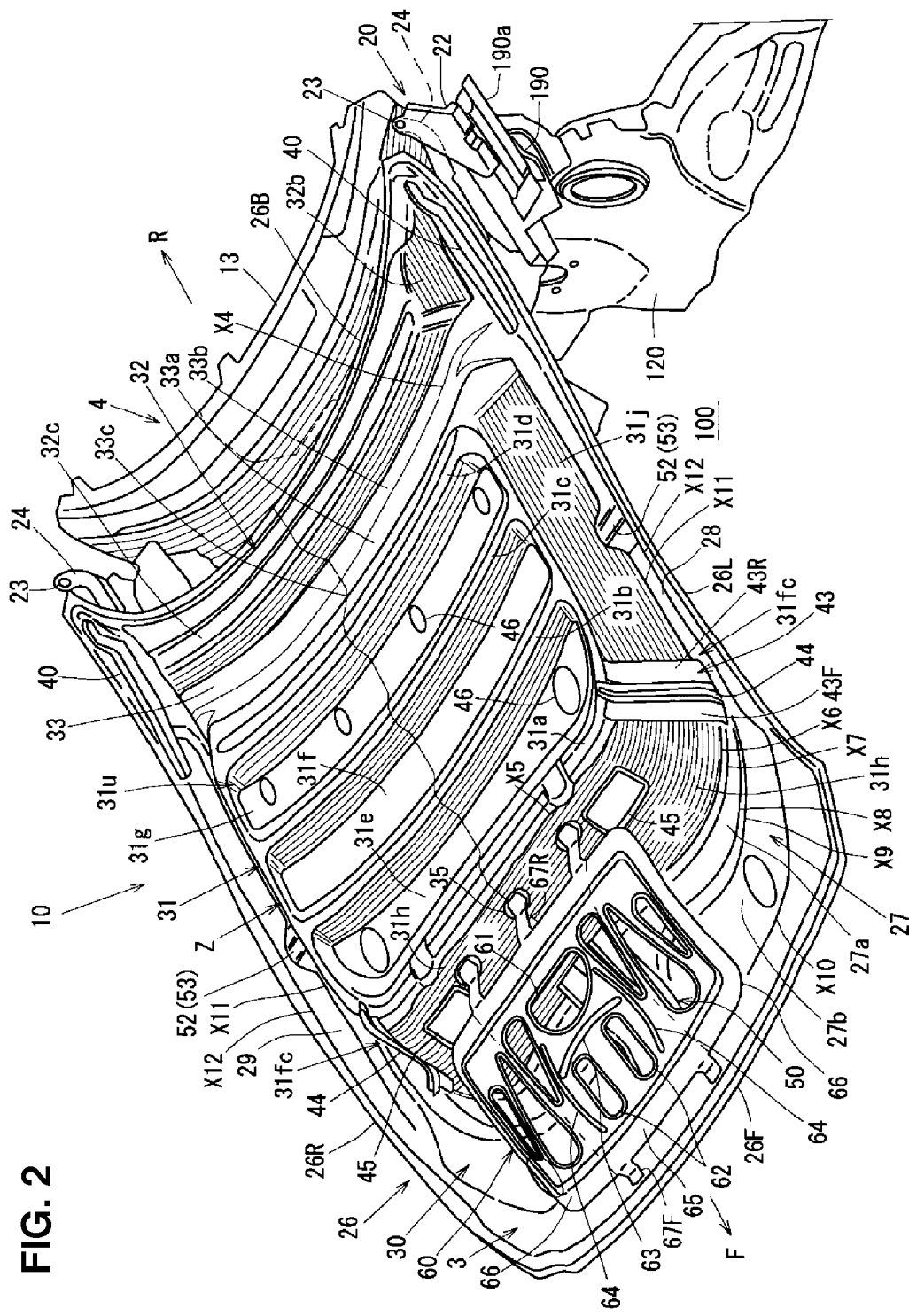
FIG. 2 is a perspective view showing the bonnet structure of the automotive vehicle in which a bonnet outer panel is removed.
Figure 3:
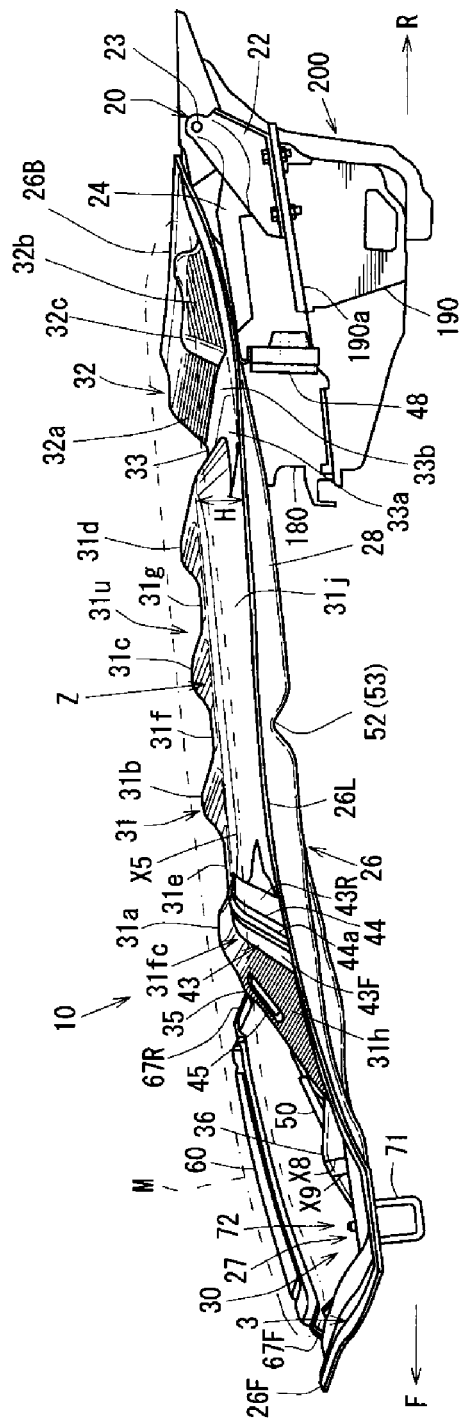
FIG. 3 is a side view of the bonnet structure of the automotive vehicle shown in FIG. 2.
Figure 4:
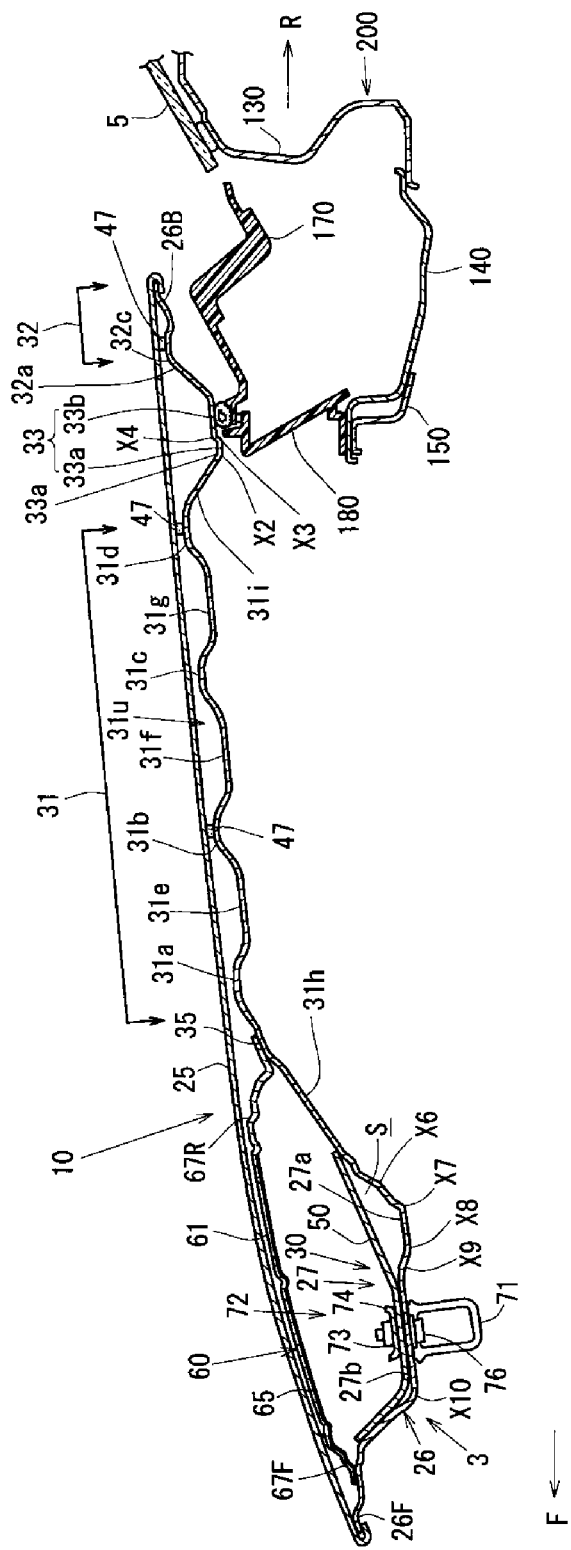
FIG. 4 is a sectional view of the bonnet structure taken along a center, in a vehicle width direction, of the bonnet stricture.
Figure 5A:
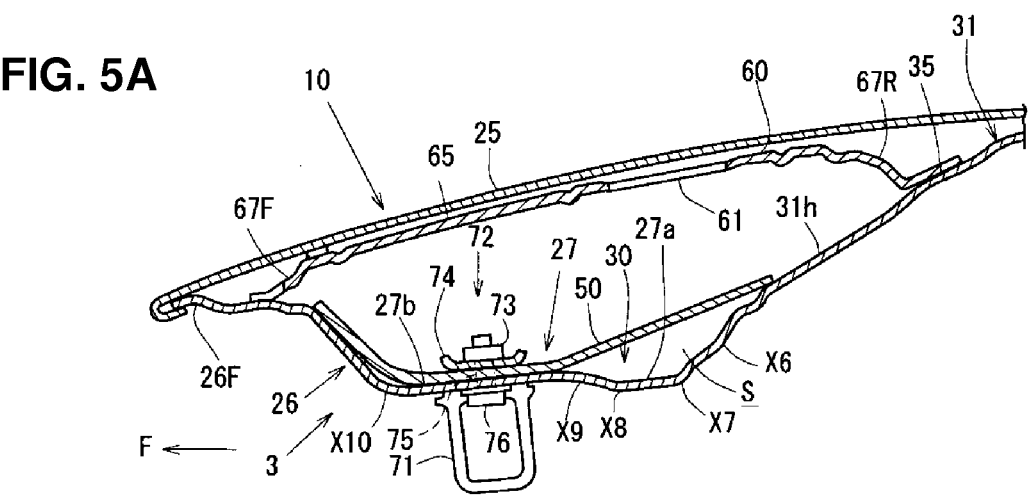
FIG. 5A is an enlarged sectional view of a front portion of FIG. 4.
Figure 5B:
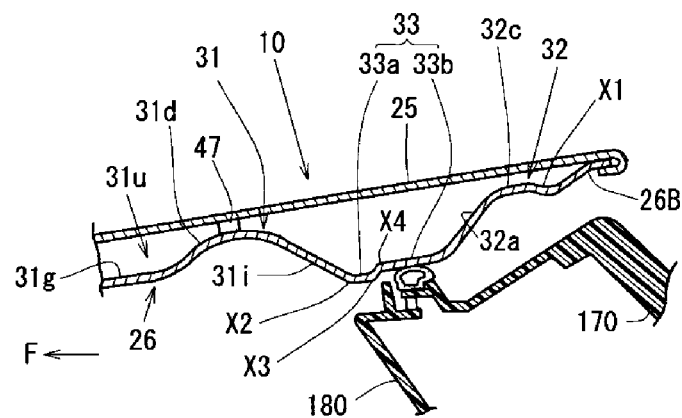
FIG. 5B is an enlarged sectional view of a rear portion of FIG. 4.
Figure 6:
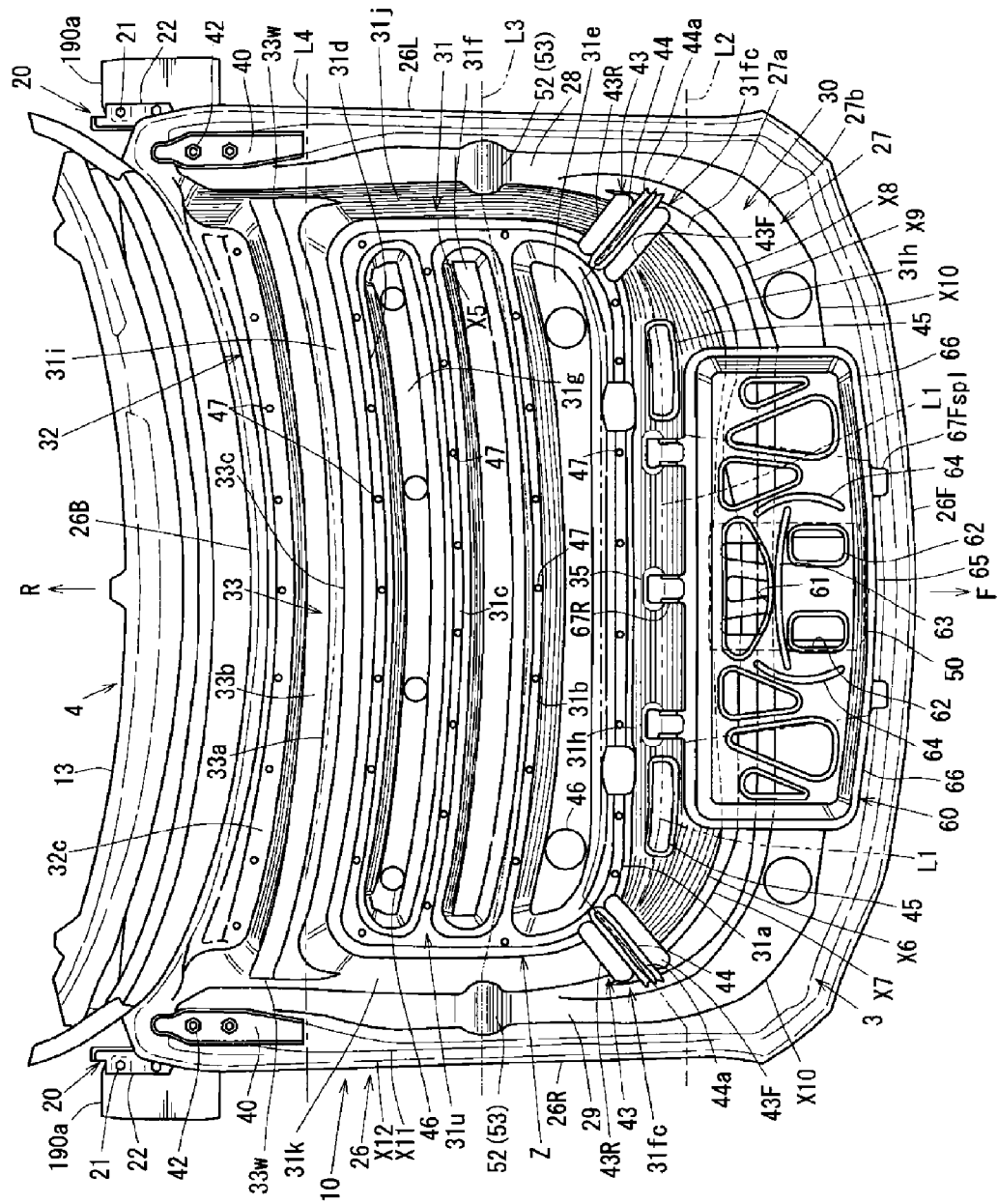
FIG. 6 is a plan view of a bonnet inner panel.
Figure 7:
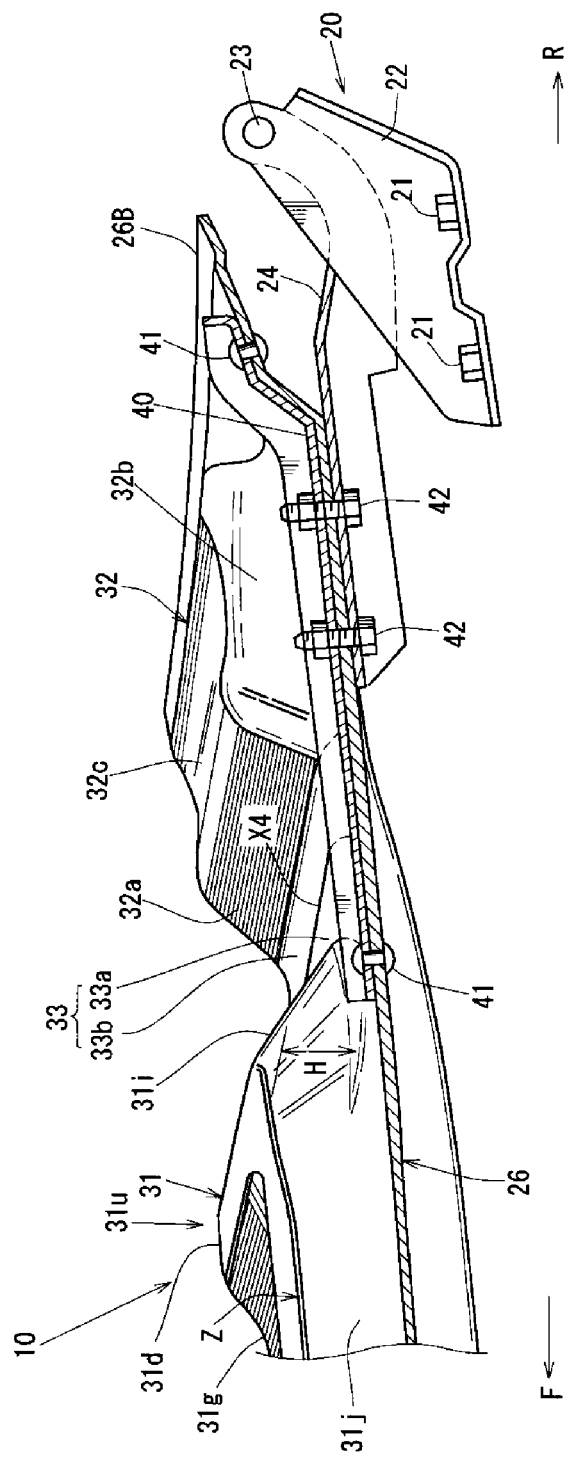
FIG. 7 is a side view showing an attachment structure of a hinge reinforcement to the bonnet inner panel.
Figure 8:
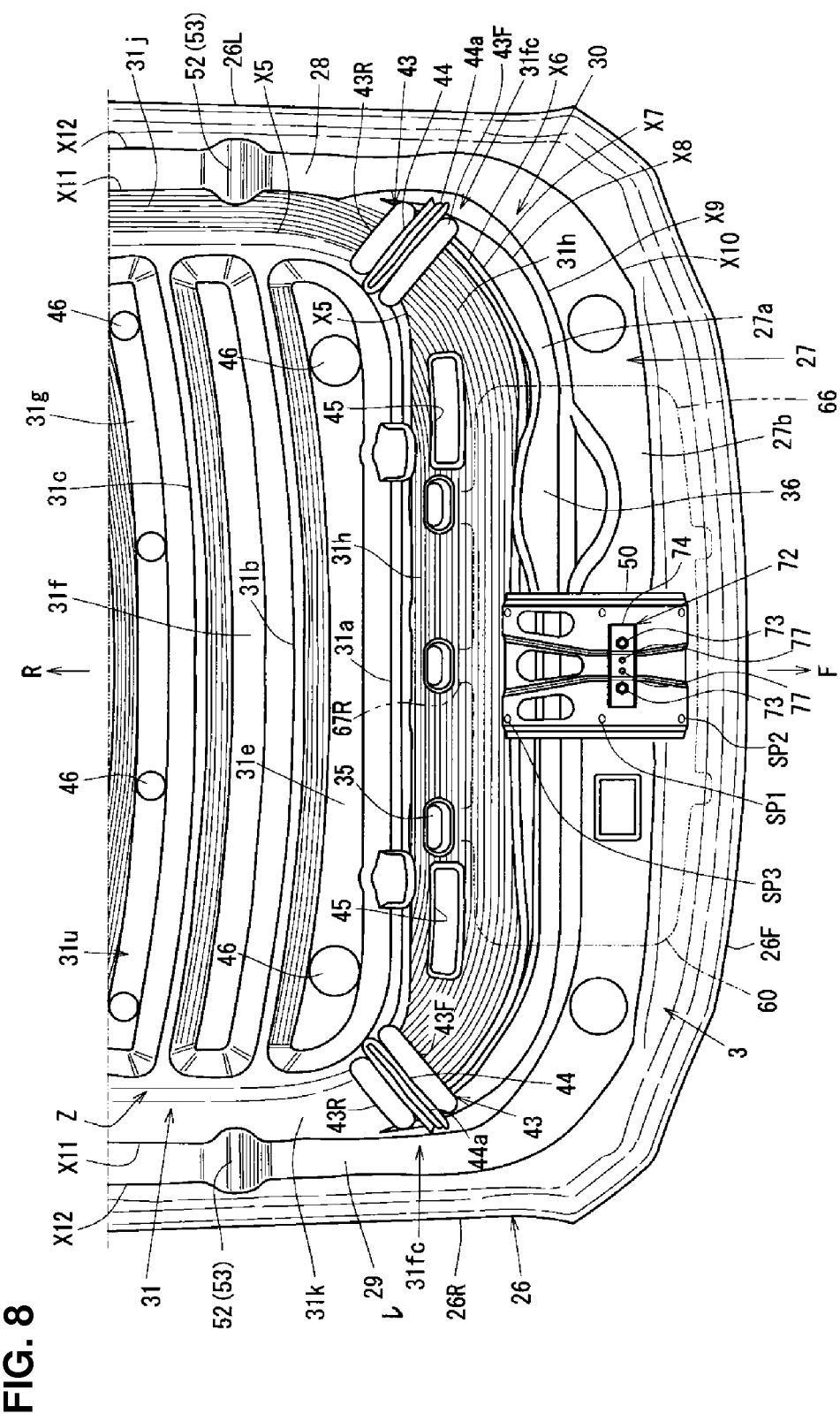
FIG. 8 is an enlarged plan view of a front portion of the bonnet inner panel showing in a state in which a stiffener is removed from the state of FIG. 6.
Figure 9:
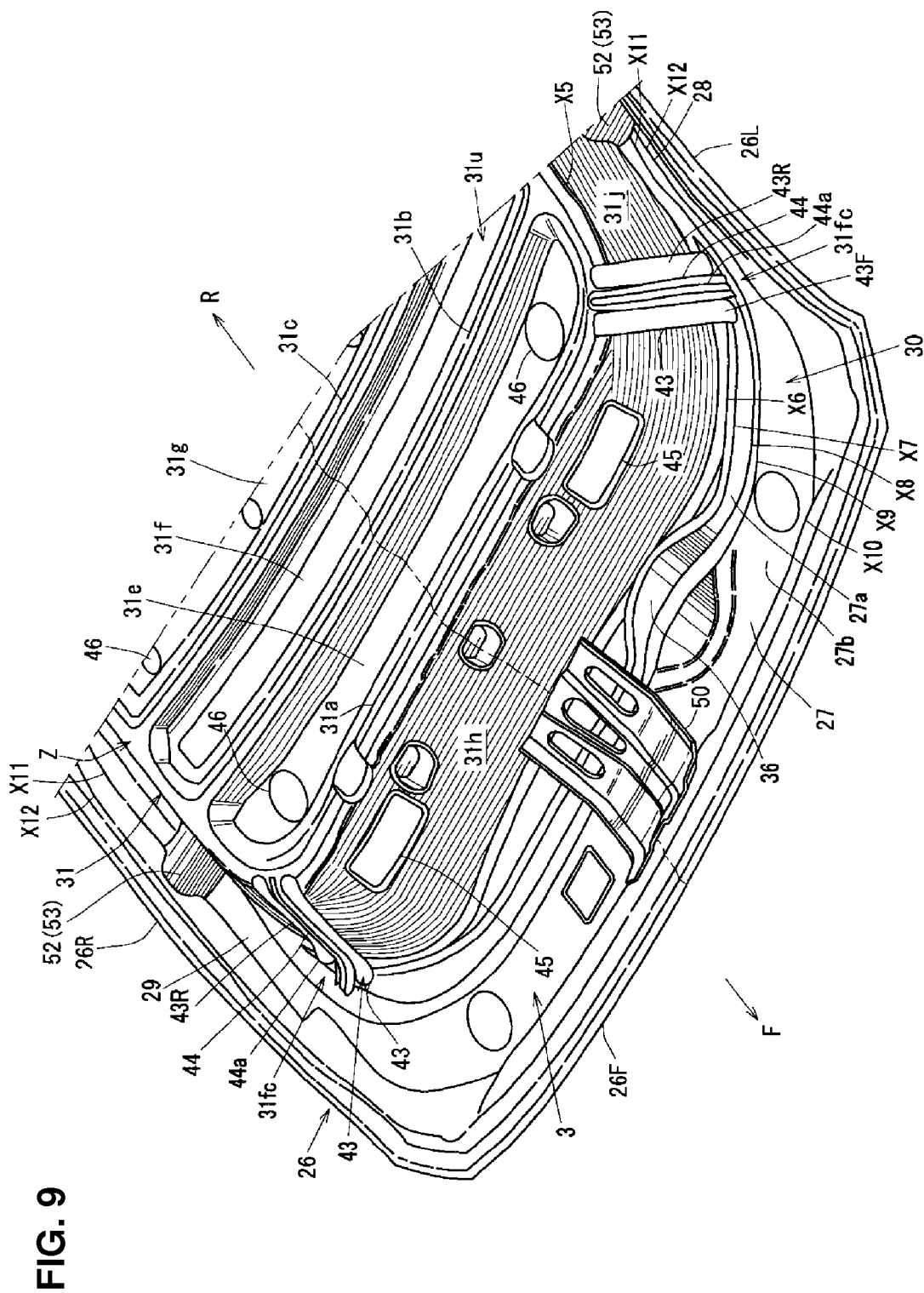
FIG. 9 is a perspective view of the bonnet structure of the automotive vehicle shown in FIG. 8.
Figure 10:
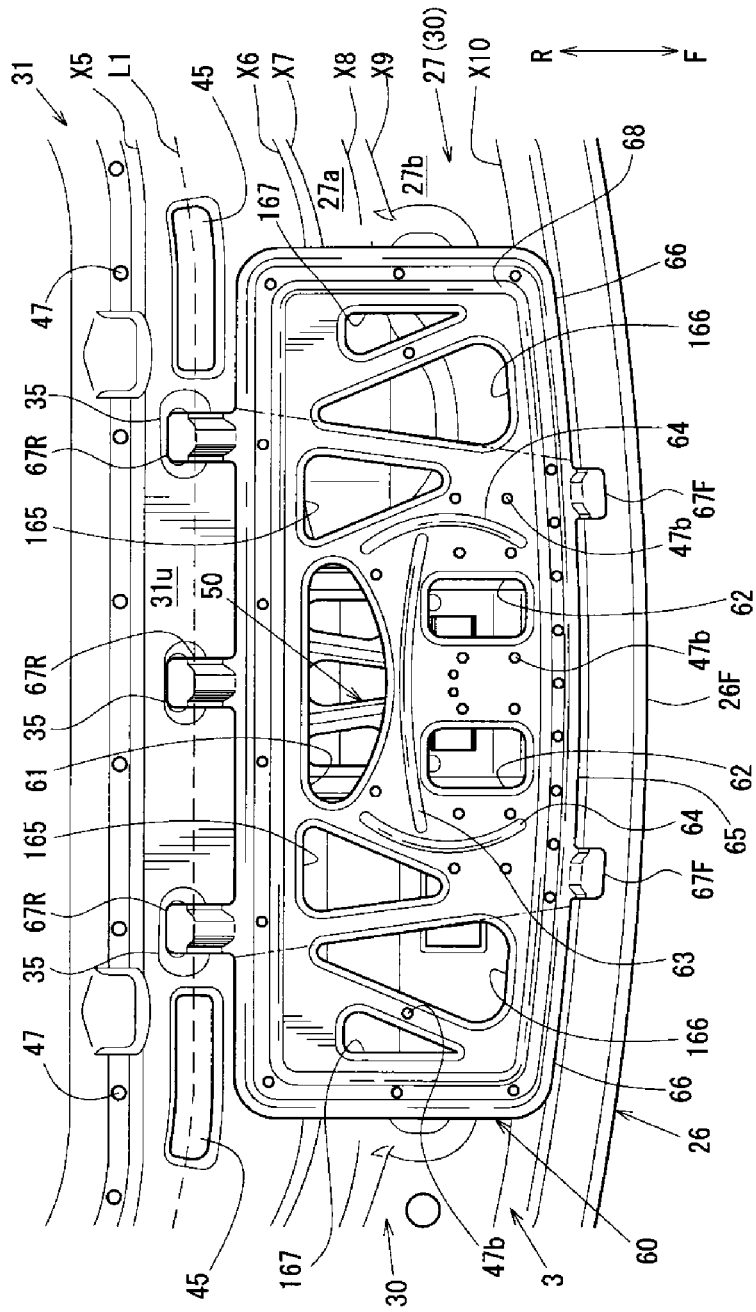
FIG. 10 is an enlarged view of the stiffener shown in FIG. 6 and its surrounding portion.
Figure 11:
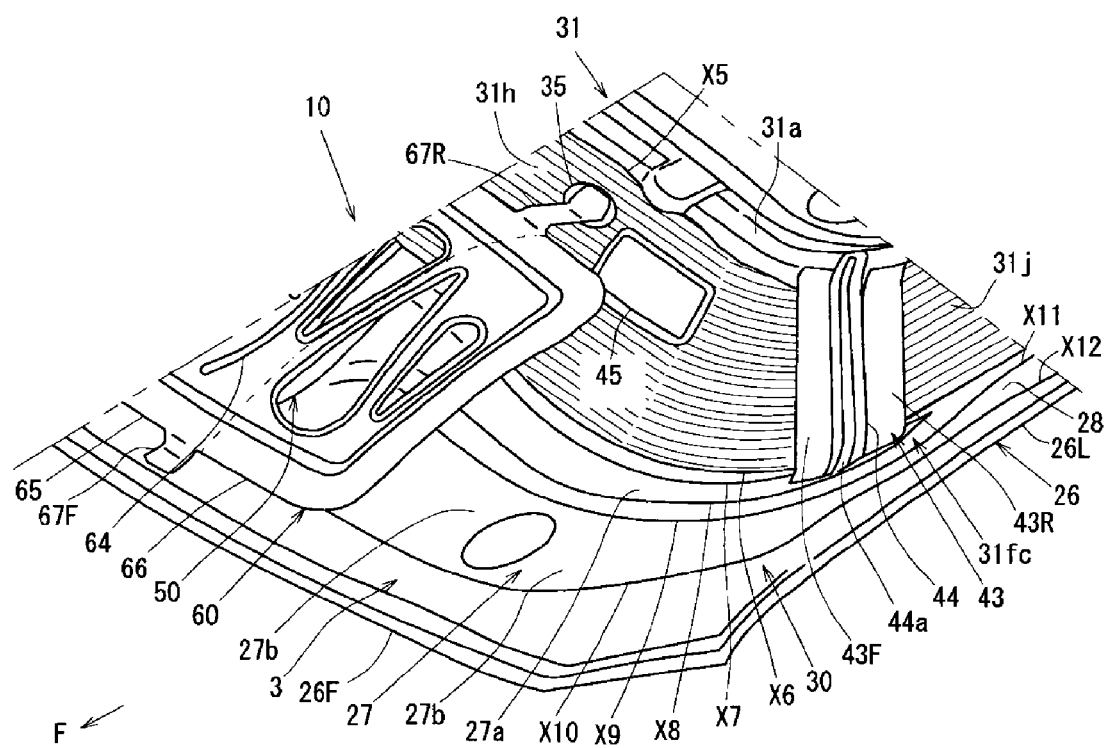
FIG. 11 is an enlarged view of a front-side corner portion of a central protrusion portion in FIG. 2 and its surrounding portion.

Hereafter, an embodiment of the present invention will be described specifically referring to the drawings. The drawings show a bonnet structure of an automotive vehicle, FIG. 1 is a perspective view of a front portion of the automotive vehicle equipped with a bonnet which can open or close an engine room, FIG. 2 is a perspective view showing the bonnet structure of the automotive vehicle in which a bonnet outer panel is removed, FIG. 3 is a side view of the bonnet structure of the automotive vehicle shown in FIG. 2, FIG. 4 is a sectional view of the bonnet structure taken along a center, in a vehicle width direction, of the bonnet stricture, FIG. 5A is an enlarged sectional view of a front portion of FIG. 4 and FIG. 5B is an enlarged sectional view of a rear portion of FIG. 4, FIG. 6 is a plan view of a bonnet inner panel, FIG. 7 is a side view showing an attachment structure of a hinge reinforcement to the bonnet inner panel, FIG. 8 is an enlarged plan view of a front portion of the bonnet inner panel showing in a state in which a stiffener is removed from the state of FIG. 6, and FIG. 9 is a perspective view of the bonnet structure of the automotive vehicle shown in FIG. 8. FIG. 10 is an enlarged view of the stiffener shown in FIG. 6 and its surrounding portion, FIG. 11 is an enlarged view of a front-side corner portion of a central protrusion portion 31 in FIG. 2 and its surrounding portion, FIGS. 12A-12D are schematic side views showing deformation states of the bonnet which occur in order in a vehicle frontal collision, and FIG. 13 is a graph showing a time change of a load applied to the bonnet in the collision. Herein, in FIGS. 12A-12D, reference character a denotes a position of a striker 71 in a normal state (before a vehicle frontal collision), and an arrow F shows a vehicle forward direction and an arrow R shows a vehicle rearward direction in the figures.

As shown in FIG. 1, a bonnet (engine hood) 10 which covers over an engine room 100 is provided at an upper face of a front portion of an automotive vehicle of the present embodiment.

The bonnet 10 comprises a steel-plate made bonnet outer panel 25 (hereafter, referred to as "outer panel 25") which forms an outer face of the bonnet 10 and a rear portion of which is pivotally supported at a vehicle body 400 via a bonnet hinge 20 so as to open or close an engine room 100 and an aluminum made or aluminum-alloy made bonnet inner panel 26 (hereafter, referred to as "inner panel 26") which is arranged inside of the outer panel 25. The outer panel 25 and the inner panel 26 are provided to face each other with a gap between them, and integrally formed through hemming processing in which a peripheral edge portion of the outer panel 25 is bent toward a peripheral edge portion of the inner panel 26 such that the peripheral edge portion of the inner panel 26 is interposed between outside and inside parts of the peripheral edge portion of the outer panel 25.

As shown in FIGS. 2 and 6 which show the state in which the outer panel 25 is removed, the peripheral edge portion of the inner panel 26 includes a front side portion 26F, right and left side portions 26L, 26R, and a rear side portion 26B. Further, at the peripheral edge portion of the inner panel 26 is provided an outside frame portion 3 which is formed in a U shape in the plan view by the front side portion 26F and the right and left side portions 26L, 26R such that its rear side opens and has a thickness which is thinner than an inside part (a central part) of the inner panel 26.

The outside frame portion 3 has a frame-shaped groove 30 which is formed in a recess-groove shape, extending along the outside frame portion 3 in a U shape, such that its rear side opens in the plan view. The frame-shaped groove 30 comprises a lateral groove 27 which is formed in a recess shape, extending in the vehicle with direction along the front side portion 26F, a side groove 29 which is formed in a recess shape, extending in the vehicle longitudinal direction along the right side portion 26R, and a side groove 28 which is formed in a recess shape, extending in the vehicle longitudinal direction along the left side portion 26R. These grooves 28, 27, 29 are formed continuously along a groove-forming direction of the frame-shaped groove 30.

Further, as shown in FIGS. 2, 3, 4 and 6, the central protrusion portion 31 and a rear protrusion portion 32 are provided inside the outside frame portion 3 of the inner panel 26. Herein, the central protrusion portion 31 is configured such that its central portion protrudes upward from the outside frame portion 3, and the rear protrusion portion 32 is configured such that it is positioned in back of the central protrusion portion 31 and extends along the rear side portion 26B of the inner panel 26. These two protrusion portions 31, 32 are arranged side by side in the vehicle longitudinal direction.

A deep-drawn groove 33 as a reinforcement portion which is formed in a recess-groove shape is provided between the central protrusion portion 31 and the rear protrusion portion 32 of the inner panel 26 to extend in the vehicle width direction. The central protrusion portion 31, the rear protrusion portion 32, and the deep-drawn groove 33 are enclosed from three sides by the U-shaped frame portion 3, i.e., the both side grooves 28, 29 and the lateral groove 27 (see FIGS. 2 and 6).

Herein, the above-described rear protrusion portion 32 comprises, as shown in FIGS. 5B and 7, a front wall 32a which slants forward and downward and side walls 32b. A convex portion 32c for supporting the outer panel 25 is provided at an upper front edge of the rear protrusion portion 32 to extend in the vehicle width direction, being located forward apart from a rear end of the bonnet 10. Accordingly, the groove depth of the deep-drawn groove 33 becomes deeper because of the above-described convex portion 32c, and the hinge support rigidity and the tensile rigidity of a rear portion of the outer panel 25 are increased, compared to a structure in which the convex portion is provided at a rear edge of the rear protrusion portion 32. Also, at least a single ridgeline X1 which extends in the vehicle width direction is formed by providing the above-described convex portion 32c as shown in FIG. 5B.

The above-described deep-drawn groove 33 is formed in the deep recess-groove shape through plural-time pressing (press processing). The deep-drawn groove 33 comprises, as shown in FIGS. 4 and 5B, a deep-drawn main groove 33b which is provided on the side of the central protrusion portion 31 and a deep-drawn sub groove 33a which has a deeper depth and is provided on the side of the central protrusion portion 31 from a bottom face of the deep-drawn main groove 33b. Plural ridgelines X2, X3, X4 are formed along the deep-drawn sub groove 33a by providing the deep-drawn sub groove 33a.

As shown in FIGS. 2 and 6, the above-described deep-drawn groove 33 curves such that a curve central portion 33c, in the vehicle width direction, thereof protrudes forward, in the plan view, to a position forward of a front end of a hinge reinforcement 40, which will be described later, which is provided at a side end, in the vehicle width direction, of the deep-drawn groove 33. The hinge support rigidity is increased over a range to the position forward of the front end of the hinge reinforcement 40 by the above-described curve structure of the deep-drawn groove 33, and the rigidity against the mouth-opening deformation of the deep-drawn groove 33 is also increased by this curve structure.

As shown in FIGS. 2 and 6, the right and left side grooves 28, 29 of the frame-shaped groove 30 are the ones provided to extend in the vehicle longitudinal direction at both right-and-left side portions of the inner panel 26, and configured to be depressed downward from the deep-drawn groove 33, and the above-described hinge reinforcement 40 is fixed to a portion of the inner panel 26 beside the side grooves 28, 29 at a level located below the deep-drawn groove 33 as shown in these figures.

The above-described central protrusion portion 31 is configured to absorb the impact energy when the vehicle collides with the collision object, and an upper face 31u of the central protrusion portion 31 is formed in an uneven shape (ladder-shape structure).

That is, the central protrusion portion 31 comprises, as shown in FIGS. 2, 3, 4 and 6, a convex portion 31a which is located at its upper front side thereof and extends in the vehicle width direction, a convex portion 31b which extends in the vehicle width direction in back of the convex portion 31a, a convex portion 31c which extends in the vehicle width direction in back of the convex portion 31b, a convex portion 31d which is located at its upper rear side and extends in the vehicle width direction, and recess portions 31e, 31f, 31g which extend in the vehicle width direction at respective positions between the convex portions 31a, 31b, the convex portions 31b, 31c, the convex portions 31c, 31d. The upper face 31u of the central protrusion portion 31 which has the inertia mass is configured to have a higher rigidity, compared to a lower-side portion of the central protrusion portion 31.

As shown in FIGS. 6, 8 and 9, at the recess portion 31e and the recess portion 31g of the central protrusion portion 31 are formed plural opening portions for weight reduction 46. Additionally, as shown in FIG. 6, at respective top deck faces of the convex portions 31a, 31b, 31c of the central protrusion portion 31 and the convex portion 32c of the rear protrusion portion 32 are provided fillers 47 (illustrated with white-circle marks in FIG. 6) for adhesively fixing the inner panel 26 to the outer panel 25 therewith. Herein, illustrations of the fillers 47 are omitted in FIGS. 2, 3, 7-9 for convenience.

The central protrusion portion 31 comprises, as shown in FIGS. 2 and 6, a front slant face 31h which slants upward and rearward from the front side portion 26F of the inner panel 26 to the convex portion 31a, a rear slant face 31i which slants downward and rearward from the convex portion 31d, and right-and-left side slant faces 31j, 31k which respectively slant downward and outward from right-and-left upper sides of the central protrusion portion 31.

Further, as shown in FIGS. 3, 4 and 5A, a striker 71 which is locked by being engaged with a latch (not illustrated) provided on a vehicle-body side when the bonnet 10 is closed is provided at a front portion (the front side portion 26F) of a central portion, in the vehicle width direction, of the inner panel 26 in a state in which it projects downward. As shown in FIGS. 4, 5A and 8, a striker attachment portion 72 is provided at the front portion (the front side portion 26F) of the central portion, in the vehicle width direction, of the inner panel 26, and an attaching plate (retainer) 74 to which a nut 73 is welded is provided at the striker attachment portion 72 in a state in which a striker reinforcement 50 as a reinforcing member is interposed between the attaching plate 74 and the front portion of the inner panel 26.

Further, the attaching plate 74 is joined by riveting to the striker reinforcement 50, a through hole 75 is formed at a base portion of the striker 71, the front portion of the inner panel 26, and the striker reinforcement 50 (see FIG. 5A), and a bolt 76 is inserted into the through hole 75 from below. The bolt 76 is fastened to the nut 73, thereby fixing these members as a unit. Reference character 77 denotes rivets for rivet joint in FIG. 8.

As shown in FIGS. 4 and 5A, the striker reinforcement 50 is arranged onto the front portion of the inner panel 26, and a stiffener 60, which will be described later, is provided above the striker reinforcement 50 to be spaced upward apart from the striker reinforcement 50. The striker reinforcement 50 is spaced downward apart from the stiffener 60 by a specified distance that is greater than a protrusion height H (see FIGS. 3 and 7) of the rear portion of the central protrusion portion 31.

As shown in FIGS. 4 and 5A, the striker reinforcement 50 is provided to extend from the striker attachment portion 72 provided at the front portion (the front side portion 26F), beyond over a step portion 27a of the lateral groove 27, to a lower portion of the front slant face 31h of the central protrusion portion 31. That is, the striker reinforcement 50 is provided to extend between both sides, in a groove width direction, of the step portion 27a of the lateral groove 27 at the front portion of the central protrusion portion 31.

Thereby, a closed-cross section space S is formed by the striker reinforcement 50 and a portion of the inner panel 26 which corresponds to the striker reinforcement 50 (see FIG. 5A).

As shown in FIGS. 4 and 5A, the above-described stiffener 60, which is a plate-shaped reinforcing member to reinforce a deformation resisting power of a tip portion of the bonnet against the collision, is provided to extend between the front slant face 31h of the central protrusion portion 31 and the front end portion of the inner panel 26 over the striker attachment portion 72 and the striker reinforcement 50.

And, the rigidity of the bonnet 10 in the normal state is ensured by the deep-drawn groove 33, the frame-shaped groove 30, and the stiffener 60, and also the crush stroke in a vertical direction is made properly long, making an inertia mass concentrate on an upper portion of the bonnet 10 as a whole, by the central protrusion portion 31, the rear protrusion portion, and the stiffener 60, so that appropriate reaction characteristics, which is shown in FIG. 13 showing collision-load characteristics of the bonnet 10, in which a reaction force for the collision load is large in the collision's initial stage but small in the collision's late stage is provided.

As shown in FIGS. 2, 6 and 10, the stiffener 60 has plural upper-and-lower openings 61, 62, which will be described, a lateral bead 63 which curves vertically and extends in the vehicle width direction is provided between the upper opening 61 and the lower opening 62, and a pair of longitudinal beads 64, 64 which curve outward and extend in the vehicle longitudinal direction are provided at both side portions of the lateral bead 63. Herein, these reinforcing beads 63, 64 configure a holding starting point, respectively, so that it can be properly prevented that the damping stroke of the collision object reduces.

As shown in FIGS. 2 and 6, the stiffener 60 is positioned at the central portion in the vehicle width direction and has a roughly rectangular shape in the plan view and is made of a roughly flat-shaped steel plate. The stiffener 60 is arranged at a position such that it faces the striker reinforcement 50 located below with a specified distance and also face a lower face of the outer panel 25 located above as shown in FIG. 5A.

As shown in FIGS. 2, 6 and 10, a flat-plate shaped portion of this stiffener 60 integrally comprises a body portion 65 which includes plural leg portions 67 (67F, 67R) extending downward from its front and rear ends and extension portions 66 which extend in a cantilever shape in the vehicle width direction from both sides of the body portion 65. As shown in FIGS. 2, 3, 4, 5A and 6, the stiffener 60 has three rear leg portions 67R at a rear end portion of the body portion 65 and has two front leg portions 67F at a front end portion of the body portion 65.

The rear leg portions 67R are arranged at a central portion and both side portions, in the width direction, of the body portion 65 (see FIGS. 2, 6 and 10), and slant downward and rearward from the rear end of the body portion 65, respective tips of which are formed in a flange shape so that these tips can be bolt-joined to joint points at an upper portion of the front slant face 31h (see FIGS. 4 and 5A).

The front leg portions 67F are arranged at positions which are alternatively different from the positions where the three rear legs 67R in the vehicle width direction of the stiffener 60 (see FIGS. 2, 6 and 10), and extend downward from the front end of the body portion 65, respective tips of which are formed in a flange shape so that these tips can be bolt-joined to joint points at the front side portion 26 of the inner panel 26 (see FIGS. 4 and 5A).

As shown in FIGS. 2, 3, 4, 5A and 6, the joint points of the rear leg portions 67R to the upper portion of the front slant face 31h form stiffener protrusion-shaped joint portions 35 which are respectively configured to protrude in a dome shape. The three stiffener protrusion-shaped joint portions 35 are provided at three points which are spaced in the vehicle width direction with a specified distance on the upper portion of the front slant face 31h as shown in FIGS. 2, 6 and 10.

Moreover, the stiffener 60 includes a ring-shaped groove bead 68 which is formed inside and along a peripheral edge of the stiffener 60 as shown in FIG. 10. Herein, the ring-shaped groove bead 68 is configured such that the shape of its longitudinal-cross section taken along the vehicle longitudinal direction is a roughly semicircular shape.

The stiffener 60 has two front opening holes 62, 62 which are located on the front side and a single rear opening hole 61 which is located on the rear side at a central portion, in the vehicle width direction, thereof inside the ring-shaped groove bead 68 in the plan view (see FIG. 10).

The stiffener 60 further has a lateral bead 63 which extends in the vehicle width direction between the front opening holes and the rear opening hole 61 and a pair of longitudinal beads 64 which extend in the vehicle longitudinal direction near both ends, in the vehicle width direction, of the lateral bead 63 (see FIG. 10).

Additionally, an outward-side portion which is located on the outward side, in the vehicle width direction, of the longitudinal bead 64 is configured in a truss shape by three roughly-triangular opening holes in the plan view. More specifically, a first triangular opening hole 165 having a peak located forward is formed close to and on the outward side, in the vehicle width direction, of the longitudinal bead 64 (see FIG. 10).

Further, a second triangular opening hole 166 having a peak located rearward which is larger than the first triangular opening hole 165 is formed at a position which is located outward apart from the first triangular opening hole 165, and a third triangular opening hole 167 having a peak located forward which is smaller than the first triangular opening hole 165 is formed at a position which is located outward apart from the second triangular opening hole 166 (see FIG. 10).

Thus, the outward-side portion of the stiffener 60 which is located on the outward side, in the vehicle width direction, of the longitudinal bead 64 is configured in the truss shape by the first triangular opening hole 165, the second triangular opening hole 166, and the third triangular opening hole 167.

The front opening holes 62 and the rear opening hole 61 are configured to respectively have a hole space large enough to allow a tip of a welding tool to be inserted therein. This welding tool is operated so as to approach spot welding points SP1, SP2, SP3 (see FIG. 8) of the striker connecting members (the striker reinforcement 50 and the attaching plate 74).

More specifically, the front opening hole 62 has a roughly rectangular-shaped opening which is longer in the vehicle longitudinal direction in the plan view as shown in FIG. 10. This front opening hole 62 is configured such that a front side portion of the striker reinforcement 50 is exposed in a state in which the stiffener 60 is joined to the inner panel 26 (see FIG. 8).

Also, the two front opening holes 62 are arranged with a specified distance in the vehicle width direction therebetween such that an edge of each outward side, in the vehicle width direction, thereof is located inward of an edge, in the vehicle width direction, of the striker reinforcement 50.

As shown in FIG. 10, the rear opening hole 61 has an oval opening which is longer in the vehicle width direction in the plan view, and is configured such that a forward edge of the oval opening protrudes forward in a curve shape. This rear opening hole 61 has the width, in the vehicle width direction, which is slightly longer than the width, in the vehicle width direction, of the striker reinforcement 50, and is positioned such that a rear side portion of the striker reinforcement 50 is exposed in the plan view.

Herein, the front opening holes 62, the rear opening hole 61, the first triangular opening hole 165, the second triangular opening hole 166, and the third triangular opening hole 167 are formed by making holes through burring processing and then bending edges in the flange shape.

As shown in FIG. 10, the lateral bead 63 has its length in the vehicle width direction which is longer than that of the rear opening hole 61 in the plan view, and is configured in a curve shape such that its central portion in the vehicle width direction projects rearward. Herein, this lateral bead 63 is configured such that the shape of its longitudinal-cross section taken along the vehicle longitudinal direction is a roughly semicircular shape protruding downward as shown in FIG. 2.

As shown in FIG. 10, each of the longitudinal beads 64 is configured in a curve shape such that it extends from a front position corresponding to the vicinity of a front end of the front opening hole 62 to a rear position corresponding to a central portion of the rear opening hole 61 in the vehicle longitudinal direction and protrudes outward in the vehicle width direction in the plan view.

This longitudinal bead 64 is arranged such that a top portion of its outward-curved shape is located near the end portion, in the vehicle width direction, of the lateral bead 63. Herein, the longitudinal bead 64 is configured such that the shape of its longitudinal-cross section taken along the vehicle width direction is a roughly semicircular shape protruding downward, similarly to the lateral bead 63. In FIG. 10, reference character 47b denotes the filler of the urethane foam which is interposed between the outer panel 25 and the stiffener 60.

As shown in FIGS. 2, 6, 8, 9 and 11, two kinds of opening portions of a pair of first opening portions 43 and a pair of second opening portions 45 are formed at the front slant face 31h of the central protrusion portion 31. The first opening portions 43 are formed in a longitudinally-long slit shape at both-side corner portions 31fc of the front slant face 31h such that they cut the front slant face 31h from the side slant faces 31j, 31k.

A pole-shaped portion 44 is provided inside of each of the first opening portions 43, and the pole-shaped portion 44 is positioned at a middle position, in the width direction, of the slit-shaped first opening portion 43. Specifically, as shown in FIGS. 2, 3, 6, 8, 9 and 11, the pole-shaped portion 44 is provided inside of the longitudinally-long slit-shaped first opening portion 43 such that it divides the first opening portion 43 into a front-side first opening portion 43F which opens on the side of the front slant face 31h and a rear-side first opening portion 43R which opens on the side of the side slant face 31j or 31k, whereby the pole-shaped portion 44 is interposed between the front-side first opening portion 43F and the rear-side first opening portion 43R. Further, the pole-shaped portion 44 includes a thick bead 44a extending vertically.

Moreover, as shown in FIGS. 2, 4, 5A, 6 and 8-11, the lateral groove 27 of the frame-shaped groove 30 comprises, including a boundary portion (a groove junction) of the lateral groove 27 and the side grooves 28, 29 at the front-side corner portion 31fc of the central protrusion portion 31, a lateral-groove body 27b and the step portion 27a which is positioned on the inward side, in the groove width direction, (on the central side of the inner panel 26) of the lateral-groove body 27b at a higher level than a bottom face of the lateral-groove body 27b.

The step portion 27a is formed as a recess-groove shaped step which is depressed from the lateral-groove body 27b over its whole length extending in the vehicle width direction (see FIGS. 4 and 5A). Herein, since some components (not illustrated), such as an intake port of an engine, are arranged below a right-side portion of the front portion of the inner panel 26, a protrusion portion 36 which protrudes upward is formed and the step portion 27a is configured to pass through the protrusion portion 36 as shown in FIGS. 3, 8 and 9. Accordingly, the step portion 27a is configured as a convex-shaped step which rises from the lateral-groove body 27b at a position corresponding to the protrusion portion 36 of the inner panel 26.

As shown in FIGS. 2, 4, 5A, 6 and 8-11, there are provided an inside ridgeline X7 which is located on the inside of the step portion 27a (i.e., which is located closer to the center of the central protrusion portion 31) and an outside ridgeline X8 which is located on the outside of the step portion 27a (i.e., which is located further from the center of the central protrusion portion 31) by forming the lateral groove 27 in the step shape (the recess-groove shape or the convex shape) as the above-described step portion 27a.

As shown in the same figures, at the lateral groove body 27b are provided an inside ridgeline X9 which is located on the inside of the lateral groove body 27b and an outside ridgeline X10 which is located on the outside of the lateral groove body 27b by forming the front side 26F in a recess-groove shape.

Further, as shown in FIGS. 2, 4, 5A, 6 and 8-11, there are provided an inside ridgeline X11 which is located on the inside of the side grooves 28, 29 of the frame-shaped groove 30 and an outside ridgeline X12 which is located on the outside of the side grooves 28, 29 of the frame-shaped groove 30 by forming the both side portions 26L, 26R of the inner panel 26 in a recess-groove shape.

As shown in FIGS. 8, 9 and 11, the lateral-groove-body outside ridgeline X10 and the side-groove outside ridgeline X12 are continuous to each other at the front-side corner portion 31fc of the central protrusion portion 31, thereby forming an outside ridgeline of the frame-shaped groove 30 extending continuously in the U shape in the plan view.

As shown in the same figures, the lateral-groove-body inside ridgeline X9 and the side-groove inside ridgeline X11 are continuous to each other at the front-side corner portion 31fc of the central protrusion portion 31, thereby forming an inside ridgeline of the frame-shaped groove 30 extending continuously in the U shape in the plan view, even at a position corresponding to the protrusion portion 36.

Meanwhile, the step-portion inside ridgeline X7 and a lower ridgeline X6 which is formed at a lower portion of the central protrusion portion 31 are cut by the first opening portion 43 at the front-side corner portion 31fc of the central protrusion portion 31 as shown in FIGS. 2, 6, 8, 9 and 11.

Specifically, as shown in FIGS. 8, 9 and 11 which enlarge and show the front portion of the inner panel 26, a roughly ring-shaped upper ridgeline X5 is formed at the upper portion of the central protrusion portion 31 and the roughly ring-shaped lower ridgeline X6 is formed at the lower portion of the central protrusion portion 31, and the first opening portion 43 cuts the upper ridgeline X5 and the lower ridgeline X6, in addition to the step-portion inside ridgeline X7, within the above-described ridgelines X5-X10.

More specifically, at the front-side corner portion 31fc of the central protrusion portion 31, the lower ridgeline X6 and the step-portion inside ridgeline X7 which is located in front of this lower ridgeline X6 and on the inside of the step portion 27a are cut by a lower end portion of the first opening portion 43, whereas the step-portion outside ridgeline X8, the lateral-groove-body inside ridgeline X9, and the lateral-groove-body outside ridgeline X10 are configured not to be cut by the lower end portion of the first opening portion 43 (see FIGS. 9 and 11).

Thereby, as described above, the lateral-groove-body inside ridgeline X9 which is not cut by the first opening portion 43 is continuous to the side-groove inside ridgeline X11 at the outside frame portion 3, and the lateral-groove-body outside ridgeline X10 is continuous to the side-groove outside ridgeline X12 at the outside frame portion 3.

Further, as shown in FIGS. 2, 3, 6, 8, 9, 10 and 11, each of the second opening portions 45 is formed in a laterally-long shape and provided at a portion of the front slant face 31h which is located between the first opening portion 43 and the stiffener protrusion-shaped joint portion 35 such that the second opening portion 45 is located downward apart from the upper ridgeline X5.

Specifically, as shown in FIGS. 2, 3, 6, 8, 9, 10 and 11, the second opening portion 45 is located at the same level as an arrangement position of the stiffener protrusion-shaped joint portion 35 at the front slant face 31h, and the second opening portion 45 and the stiffener protrusion-shaped joint portion 35 are aligned in the vehicle width direction (see a line L1 in FIG. 11, in particular).

Herein, as shown in FIGS. 2, 3 and 4, the bonnet 10 is attached to an upper-end bent portion 190a of a cowl side panel 190 which is arranged below a rear portion of the bonnet 10 via the bonnet hinge 20 so as to open or close.

As shown in FIGS. 2 and 3, the cowl side panel 190 is arranged at a vehicle-side end as part of a cowl portion 200 provided to cover over a dash lower panel 120, and is positioned at a base portion of an apron reinforcement (not illustrated).

Reference character 48 in FIG. 3 denotes a cowl seal, and in FIGS. 4 and 5B reference character 130 denotes a cowl panel, reference character 140 denotes a cowl front panel, reference character 150 denotes a cowl front reinforcement, reference character 170 denotes a cowl grille, and reference character 180 denotes a cowl grille front.

The above-described bonnet hinge 20 comprises, as shown in FIG. 7, a body-side hinge bracket 22 which is fixed to the upper-end bent portion 190a of the cowl side panel 190 by an attaching member 21, such as bolt and nut, and a bonnet-side hinge bracket 24 which is coupled to the body-side hinge bracket 22 via a hinge pin 23, and this bonnet-side hinge bracket 24 is fixedly connected to a lower face of a rear side end of the bonnet 10.

Further, as shown in FIGS. 2, 6 and 7, a pair of right-and-left hinge reinforcements 40, 40 are provided to respectively extend from a position beside the side wall 32b of the rear protrusion portion 32 to a position at the rear end of the central protrusion portion 31, passing through beside the deep-drawn groove 33.

As shown in FIGS. 6 and 7, the hinge reinforcement 40 is configured to be of a recess shape in an elevational view, and as shown in FIG. 7, joined to the inner panel 26 with rivets 41, 41 at its front and rear portions, and a longitudinal-middle portion of the hinge reinforcement 40 is fixed together to the inner panel 26 and the bonnet-side hinge bracket 24 by using attaching members 42, 42, such as bolt and nut.

As described above, by configuring each of the hinge reinforcements 40 to extend from the position beside the rear protrusion portion 32 to the position at the rear end of the central protrusion portion 31, passing through beside the deep-drawn groove 33, the vertical bending rigidity of the central portion, in the vehicle width direction, of the bonnet 10 is increased by the deep-drawn groove 33 extending laterally between the right and left hinge reinforcements 40, 40, and also the rigidity is increased so that the mouth-opening deformation of the deep-drawn groove 33 or the vertical-bending deformation of the rear portion of the bonnet 10 are prevented by the hinge reinforcement 40.

That is, the bonnet 10 including the central protrusion portion 31 is configured such that the hinge support rigidity of the rear portion of the bonnet 10 is increased and the occurrence of any improper deflection or vibration caused to the bonnet 10 by the traveling vibration, the traveling-air pressure or the like is prevented.

Herein, as shown in FIGS. 3 and 6, a ridge-holding starting point 52 which promotes an upward bending of the bonnet 10 in the vehicle frontal collision is provided at a portion of the inner panel 26 between the striker reinforcement 50 forming the lock portion and the hinge reinforcement 40.

In the present embodiment, the above-described ridge-holding starting point 52 comprises a depression portion 53 which is depressed upward from a lower face of the inner panel 26, specifically from bottom wall portions of the side grooves 28, 29, and the side slant faces 31ja, 31k of the central protrusion portion 31 as a first vertical wall extending upward from the depression portion 53.

As shown in FIG. 6, a ridge-holding line L3 which connects the right-and-left ridge-holding starting points 52, 52 in the vehicle width direction is formed by providing the ridge-holding starting points 52, 52.

As shown in FIGS. 3 and 6, the deep-drawn groove 33 which is configured to extend in the vehicle width direction and deform downward when receiving an input load greater than a longitudinal-direction proof stress thereof and a front end of the hinge reinforcement 40 are arranged side by side in the vehicle width direction at a position rearward of the ridge-holding starting point 52.

Thus, the deep-drawn groove 33 and the front end of the hinge reinforcement 40 act as a rigidity changing point, and the above-described configuration that the deep-drawn groove 33 and the front end of the hinge reinforcement 40 are arranged side by side in the vehicle width direction provides improvements of the bending rigidity of the rear portion of the bonnet 10 in the normal state and the hinge support rigidity.

Further, the configuration that the deep-drawn groove 33 as the rigidity changing point and the front end of the hinge reinforcement 40 are arranged side by side in the vehicle width direction causes the stress concentration on this rigidity changing point in the vehicle frontal collision, so that the deep-drawn groove 33 and the front end of the hinge reinforcement 40 deform downward (downward holding, valley holding). Accordingly, a bending moment to press the bonnet hinge 20 against the vehicle body is generated, so that the downward-holding deformation is promoted and the load dispersion is attained. That is, both ensuring the hinge support rigidity of the bonnet 10 and preventing the rear portion of the bonnet 10 from retreating in the vehicle frontal collision is attained.

As shown in FIGS. 2, 3 and 7, the deep-drawn groove 33 as the reinforcement portion is formed by a recess groove, and the hinge reinforcement 40 extends to a position at the front edge of the deep-drawn groove 33 (the recess groove) as shown in FIG. 7.

Thus, reinforcing against the mouth-opening deformation of the above-described recess groove (the deep-drawn groove 33) is attained by the hinge reinforcement 40, thereby proving a lightweight and high-rigidity structure. Further, the deep-drawn groove 33 effectively promotes the downward-holding deformation in the vehicle frontal collision and thereby the bonnet hinge 20 is pressed against the vehicle body, so that the frontal-collision load is dispersed properly.

As shown in FIGS. 6 and 7, the front end of the hinge reinforcement 40 is provided at a position which is located forward of a lower edge of the rear slant face 31*i* and beside or rearward of an upper edge of the rear slant face 31*i* in the vehicle longitudinal direction.

Thus, the lower edge of the central protrusion portion 31 is reinforced by the hinge reinforcement 40, thereby providing a lightweight and high-rigidity structure. Further, the rigidity in the normal state is also controlled at the position at the front end of the hinge reinforcement 40.

As shown in FIGS. 3 and 6, a frontal-collision load transmission path Z (specifically, the upper face 31*u* and the side slant faces 31*j*, 31*k* of the central protrusion portion 31) is provided to extend in the vehicle longitudinal direction at a level located above the hinge reinforcement 40 relative to the deep-drawn groove 33 as the reinforcement portion.

Thus, the frontal-collision load transmission path Z (the upper face 31*u* and the side slant faces 31*j*, 31*k* of the central protrusion portion 31) exists above the hinge reinforcement 40, so that the load is surely transmitted rearward in an initial stage of the collision, and the downward-holding deformation is further surely promoted by the offset distance in the vertical direction provided between the hinge reinforcement 40 and the frontal-collision load transmission path Z. Since the deep-drawn groove 33 and the front end of the hinge reinforcement 40 are arranged side by side in the vehicle width direction in back of the above-described frontal-collision load transmission path Z (the upper face 31*u* and the side slant faces 31*j*, 31*k* of the central protrusion portion 31), a valley-holding line L4 which connects respective front ends of the right-and-left hinge reinforcements 40, 40 in the vehicle width direction is formed.

As shown in FIG. 6, the deep-drawn groove 33 as the reinforcement portion comprises a recess portion which is recessed downward from the upper face of the inner panel 26 and a second vertical wall 33*w* (specifically, a vertical wall between the groove bottom portion of the deep-drawn groove 33 show in FIG. 6 and the right-and-left side grooves 28, 29) which extends downward from the recess portion. Thus, the rigidity of the second vertical wall 33*w* in the normal state is ensured.

Further, as shown in FIG. 3, the ridge-holding starting point 52 which comprises the depression portion 53 and the side slant faces 31*j*, 31*k* of the central protrusion portion as the first vertical wall is provided, and the deep-drawn groove 33 which comprises the above-described recess portion and the second vertical wall 33*w* is provided in back of this ridge-holding starting point 52. Thus, the amount (degree) of load-absorption caused by deformation is increased by the ridge-holding starting point 52 and the reinforcement portion (the deep-drawn groove 33). Also, the frontal-collision load applied to the hinge reinforcement 40 is dispersed from the hinge reinforcement 40 which deforms downward to the vehicle body, so that preventing the rear portion of the bonnet 10 from retreating can be further attained.

Herein, as shown in the plan view of FIG. 6, at the inner panel 26 are provided, in addition to the ridge-holding line L3 and the valley-holding line L4, the valley-holding line L1 (a line which has valley-holding deformation in the collision object's collision) which connects the second opening portion 45, the rear leg portion 67R and the rear-side first opening portion 43R in the vehicle width direction, and a pre ridge-holding line L2 (a front ridge-holding stating-point portion) which connects the right and left pole-shaped portions 44, 44 formed at the front-side corner portions 31*fc*, 31*fc* of the central protrusion portion 31 from their lower portions to their upper portions and then connects the respective upper portions of the pole-shaped portions 44, 44 in the vehicle width direction along the rear face of the convex portion 31*a*.

Figure 12A:
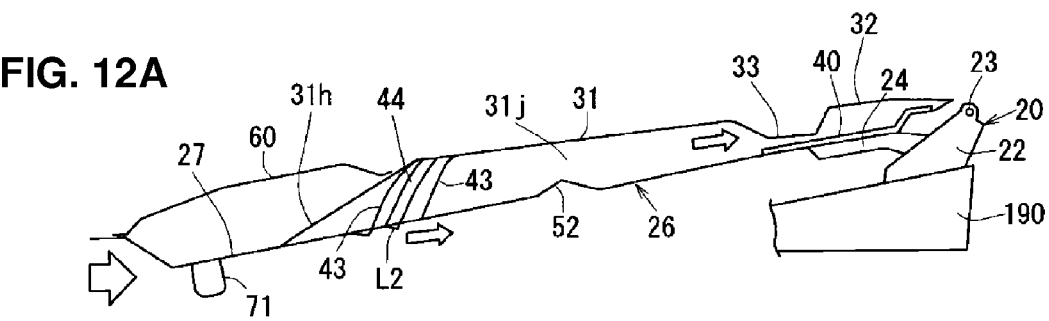
FIGS. 12A-12D are schematic side views showing deformation states of the bonnet which occur in order in a vehicle frontal collision.

FIGS. 12A-12D are the schematic side views showing the deformation states of the bonnet 10 which occur in order in the vehicle frontal collision. As shown in FIG. 12A, in the vehicle frontal collision, the stress concentrates on the pre ridge-holding line L2 (the front ridge-holding staring-point portion) first and the load is transmitted rearward through the frontal-collision load transmission path (the upper face 31*u* and the side slant faces 31*j*, 31*k* of the central protrusion portion 31).

Figure 12B:
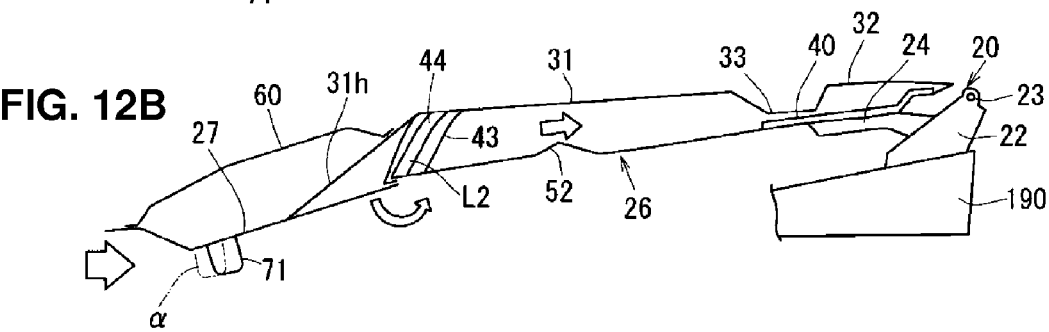
Figure 13:
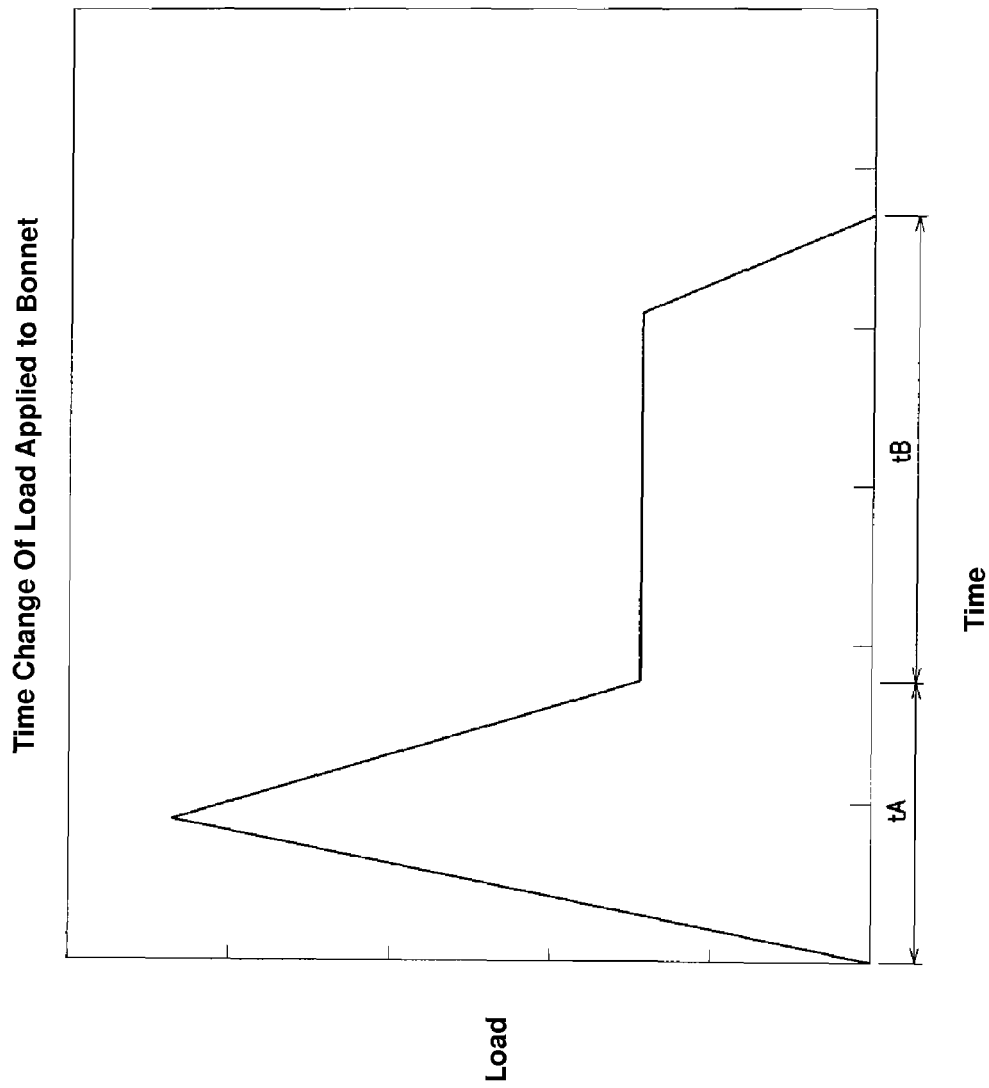
FIG. 13 is a graph showing a time change of a load applied to the bonnet in the collision.

Subsequently, as shown in FIG. 12B, the pre ridge-holding line L2 bends, so that the bonnet 10 has the ridge-holding deformation. And also, the stress concentrates on the rigidity changing points (the deep-drawn groove 33 and the front end of the hinge reinforcement 40) by the load transmitted rearward through the frontal-collision load transmission path, so that the deep-drawn groove 33 starts having the valley-holding deformation.

Figure 12C:
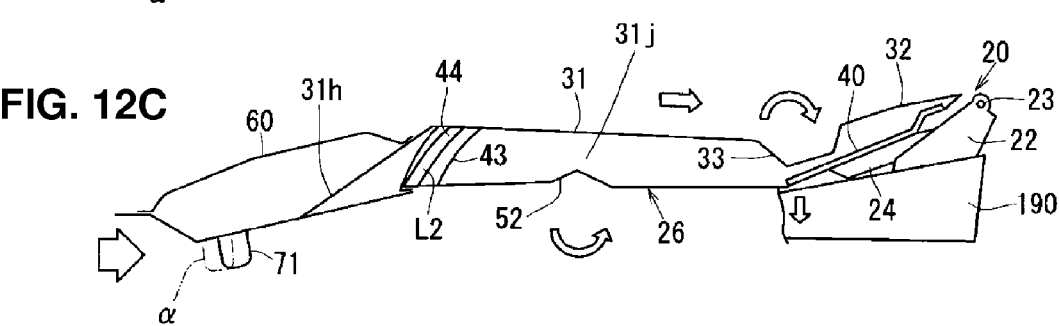

Then, as shown in FIG. 12C, according to the progress of the valley-holding deformation of the deep-drawn groove 33, the bonnet-side hinge bracket 24 of the bonnet hinge 20 hits against the vehicle body with damping, so that the stress is dispersed partially. Meanwhile, the other part of stress which has not been dispersed (damped) through the hitting of the bonnet-side hinge bracket 24 against the vehicle body concentrates on the ridge-holding starting point 52.

Figure 12D:
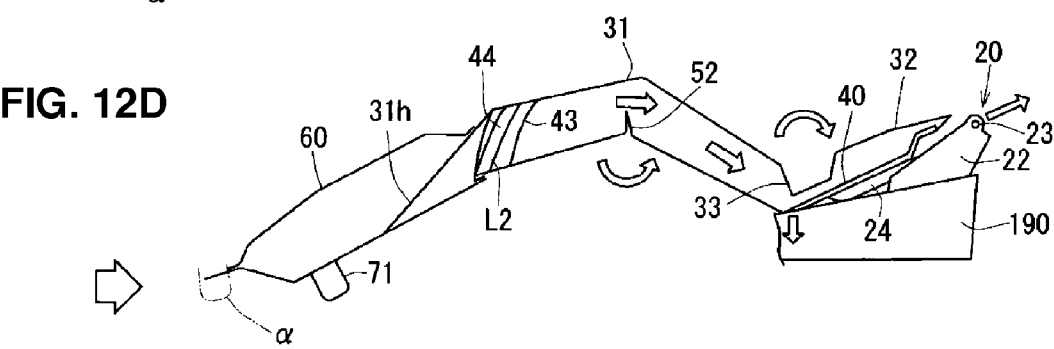

Lastly, as shown in FIG. 12D, the central protrusion portion 31 has the ridge-holding deformation because of the above-described ridge-holding starting point 52 and thereby the load is absorbed, so that the degree (amount) of the frontal-collision load transmission toward the rear side of the bonnet 10 is reduced. Also, the deep-drawn groove 33 has the more valley-holding deformation and thereby the degree (amount) of the frontal-collision load transmission toward the rear side of the bonnet 10 is reduced more, so that the retreat load to the hinge pin 23 decreases and thereby the rear portion of the bonnet 10 is prevented from moving rearward. Accordingly, the bonnet 10 in front of the hinge pin 23 has the deformation which is generated in a three-holding state.

As described above, the present embodiment is the bonnet structure of the automotive vehicle, in which the rear portion of the bonnet 10 including the outer panel 25 and the inner panel 26 is pivotally supported at the vehicle body 400 via the hinge (see the bonnet hinge 20), wherein the inner panel 26 includes the central protrusion portion 31 which protrudes upward in the vehicle elevational view and the rear protrusion portion 32 which is located in back of the central protrusion portion 31, which are arranged side by side in the vehicle longitudinal direction, the deep-drawn groove 33 is provided between the central protrusion portion 31 and the rear protrusion portion 32 to extend in the vehicle width direction, and the hinge reinforcement 40 is provided to extend from the position beside the rear protrusion portion 32 to the position at the rear end of the central protrusion portion 31, passing through beside the deep-drawn groove 33 (see FIGS. 2, 4 and 6).

According to this structure, the vertical-bending rigidity of the central portion, in the vehicle width direction, of the bonnet 10 can be increased by the deep-drawn groove 33 provided to extend in the vehicle width direction between the right-and-left hinge reinforcements 40, 40 which are provided to extend from the position beside the rear protrusion portion 32 to the position at the rear end of the central protrusion portion 33, passing through beside the deep-drawn groove 33. Further, the rigidity can be properly increased so as to prevent any mouth-opening deformation of the deep-drawn groove 33 or vertical-bending deformation of the rear portion of the bonnet 10. That is, the hinge support rigidity of the rear portion of the bonnet 10 having the central protrusion portion 31 can be properly increased, so that the occurrence of any improper deflection or vibration caused to the bonnet 10 by the traveling vibration, the traveling-air pressure or the like can be properly prevented.

Further, the deep-drawn groove 33 curves such that the central portion 33c, in the vehicle width direction, thereof protrudes forward, in the plan view, to the position forward of the front end of the hinge reinforcement 40 (see FIG. 6). According to this structure, the hinge support rigidity can be increased over a range to the position forward of the front end of the hinge reinforcement 40 by the above-described curve structure of the deep-drawn groove 33, and the rigidity against the mouth-opening deformation of the deep-drawn groove 33 can be also increased by this curve structure.

Also, the side grooves 28, 29 which are depressed downward are provided to extend in the vehicle longitudinal direction at the both right-and-left side portions of the inner panel 26, and the hinge reinforcement 40 is fixed to the portion of the inner panel 26 beside the side grooves 28, 29 at the level located below the deep-drawn groove 33 (see FIG. 6). According to this structure, the deep-drawn groove 33 and the rear protrusion portion 32 can be strengthened by the above-descried side grooves 28, 29, and since the hinge reinforcement 40 is fixed at the level below the deep-drawn groove 33, the crush space for damping of the impactor (i.e., the crush space for damping of the collision object) located above the hinge reinforcement 40 can be enlarged.

Moreover, the lock portion to be engaged with the vehicle-body side (see the striker reinforcement 50) is provided at the front portion of the bonnet 10, the ridge-holding starting point 52 to promote the upward bending is provided at the portion of the inner panel 26 between the lock portion (the striker reinforcement 50) and the hinge reinforcement 40, and the reinforcement portion (see the deep-drawn groove 33) which is configured to extend in the vehicle width direction and deform downward when receiving the input load greater than its longitudinal-direction proof stress and the front end of the hinge reinforcement 40 are arranged side by side in the vehicle width direction at the position rearward of the ridge-holding starting point 52 (see FIGS. 3, 4 and 6). According to this structure, since the deep-drawn groove 33 (the rigidity changing point) as the reinforcement portion and the front end (the rigidity changing point) of the hinge reinforcement 40 are arranged side by side in the vehicle width direction, the bending rigidity of the rear portion of the bonnet 10 and the hinge support rigidity in the normal state can be properly increased. Further, since the stress concentrates on these rigidity changing points in the vehicle frontal collision, the reinforcement portion (the deep-drawn groove 33) and the front end of the hinge reinforcement 40 deform downward (downward holding, valley holding). Accordingly, the bending moment to press the bonnet hinge 20 against the vehicle body is generated, so that the downward-holding deformation can be promoted and the load dispersion can be attained. That is, both ensuring the hinge support rigidity of the bonnet 10 and preventing the rear portion of the bonnet 10 from retreating in the vehicle frontal collision can be attained.

Further, the reinforcement portion is formed by the deep-drawn groove 33, and the hinge reinforcement 40 extends to a position at a front edge of the deep-drawn groove 33 (see FIG. 7). According to this structure, reinforcing against the mouth-opening deformation of the deep-drawn groove 33 can be attained by the hinge reinforcement 40, thereby proving a lightweight and high-rigidity structure. Further, the deep-drawn groove 33 effectively promotes the downward-holding deformation in the vehicle frontal collision and thereby the bonnet hinge 20 is pressed against the vehicle body, so that the frontal-collision load can be dispersed properly.

Also, the rear slant face 31i which is configured to slant forward and upward relative to the lower face of the portion of the inner panel 26 which is located forward of the central protrusion portion 31 is provided at the central protrusion portion 31, and the front end of the hinge reinforcement 40 is provided at the position which is located forward of the lower edge of the rear slant face 31i and beside or rearward of the upper edge of the rear slant face 31i in the vehicle longitudinal direction (see FIGS. 6 and 7). According to this structure, the lower edge of the central protrusion portion 31 can be reinforced by the hinge reinforcement 40, thereby providing the lightweight and high-rigidity structure. Further, the rigidity in the normal state can be also controlled at the position at the front end of the hinge reinforcement 40.

Moreover, the frontal-collision load transmission path Z is provided to extend in the vehicle longitudinal direction at the level located above the hinge reinforcement 40 relative to the reinforcement portion (the deep-drawn groove 33) (see FIGS. 3 and 7). In the present embodiment, the above-described frontal-collision load transmission path Z is formed by the upper face and the side faces 31j, 31k of the central protrusion portion 31. According to this structure, since the frontal-collision load transmission path Z exists above the hinge reinforcement 40, the load can be surely transmitted rearward in the initial stage of the collision, and the downward-holding deformation can be further surely promoted by the offset distance in a vertical direction provided between the hinge reinforcement 40 and the frontal-collision load transmission path Z.

Further, the ridge-holding starting point 52 comprises the depression portion 53 which is depressed upward from the lower face of the inner panel 26 and the first vertical wall (see the side slant faces 31j, 31k of the central protrusion portion 31) which extends upward from the depression portion 53, and the reinforcement portion is formed by the deep-drawn groove 33 and comprises the recess portion which is recessed downward from the upper face of the inner panel 26 and the second vertical wall 33w which extends downward from the recess portion (see FIGS. 3 and 6). According to this structure, the amount (degree) of load-absorption caused by deformation can be increased by the ridge-holding starting point 52 and the reinforcement portion (the deep-drawn groove 33). Further, the frontal-collision load applied to the hinge reinforcement 40 is dispersed from the hinge reinforcement 40 deforming downward to the vehicle body, so that preventing the rear portion of the bonnet 10 from retreating can be further attained. Additionally, the rigidity in the normal state can be properly increased by the above-described second vertical wall 33w.

Also, the striker 71 as the lock portion which is to be engaged with the vehicle-body side is provided at the front portion of the bonnet 10, the frame-shaped groove 30 which encloses the front side and the right and left sides of three portions of the central protrusion portion 31, the rear protrusion portion 32 and the deep-drawn groove 33 in the U shape and has the deeper depth than the deep-drawn groove 33 is provided at the inner panel 26, and the stiffener 60 is spaced upward apart from the striker attachment portion 72 and provided to extend between the front slant face 31h of the central protrusion portion 31 and the front side portion 26F (the front end portion) of the inner panel 26 (see FIGS. 3, 4, 5A and 10). According to this structure, the bonnet rigidity in the vehicle traveling can be properly ensured by the both protrusion portions (the central protrusion portion 31 and the rear protrusion portion 32), the both grooves (the deep-drawn groove 33 and the frame-shaped groove 30), and the stiffener 60, and also the crush stroke can be properly long, configuring an inertia-mass portion M where the inertia mass concentrates on the upper portion of the bonnet 10 as a whole, by the both protrusion portions 31, 32 and the stiffener 60, so that appropriate reaction characteristics shown in FIG. 13 in which a reaction force for the collision load is large in a collision's initial stage to but small in a collision's late stage tB can be provided.

Moreover, the striker reinforcement 50 of the striker 71 is provided to extend between the front and rear sides of the step portion 27a of the lateral groove 27, being spaced downward apart from the stiffener 60 by the specified distance which is greater than the protrusion height H (see FIGS. 3 and 7) of the rear portion of the central protrusion portion 31 (see FIGS. 3, 4 and 5A). According to this structure, both ensuring of the load-deformation stroke (crush stroke) of the central protrusion portion 31 and increasing of the rigidity (i.e., a frame rigidity) of the front portion (the lateral groove 27) of the frame-shaped groove 30 which is provided around the both protrusion portions (the central protrusion portion 31 and the rear protrusion portion 32) can be attained. Specifically, since the striker reinforcement 50 of the striker 71 is provided to be spaced downward apart from the stiffener 60 by the specified distance which is greater than the protrusion height H of the rear portion of the central protrusion portion 31, the load deformation of the central protrusion portion 31 is not blocked by interference of the striker reinforcement 50 with the stiffener 60 in the collision, so that the load-deformation stroke of the central protrusion portion 31 can be properly ensured even at a hard portion including the striker reinforcement 50. That is, since the striker reinforcement 50 of the striker 71 is provided to extend over the step portion 27a of the lateral groove 27, there is provided a closed-cross section structure S (see FIG. 4) between the front portion of the inner panel 26 and the striker reinforcement 50, so that the rigidity of the front portion of the inner panel 26 can be properly reinforced. Consequently, the safety of pedestrians against the collision can be improved by ensuring the appropriate load-deformation stroke (crush stroke) of the central protrusion portion 31, and the rigidity in the normal traveling state can be ensured by the increase of the rigidity of the front portion of the inner panel 26, so that both requirements can be satisfied.

Further, the first opening portion 43 (the front-side first opening portion 43F, the rear-side first opening portion 43R) as a pair of slits which is configured to cut the upper and lower ridgelines X5, X6 of the central protrusion portion 31 and the pole-shaped portion 44 which is interposed between the front-side first opening portion 43F and the rear-side first opening portion 43R as the first opening portion 43 are provided at the front-side corner portion 31fc of the central protrusion portion 31 (see FIGS. 2, 3, 6, 8, 9 and 11). According to this structure, the increase of resistance of the deformation which is caused by the front-side corner portion 31fc of the central protrusion portion 31 is prevented when the collision object, such as the pedestrian, collides from above, whereas the rigidity is ensured in the normal vehicle traveling and the reaction generated in the initial stage of the collision object's collision is improved, so that any improper interference with components having the high rigidity, such as parts equipped in the engine room 100, a strut tower of a front wheel and the like, (so-called bottoming) can be properly prevented.

Also, the step portion 27a is provided at the forward position of the central protrusion portion 31, and the first opening portion 43 (43F, 43R) as the slit is configured to cut the inside ridgeline X7 which is formed by providing the step portion 27a at the position closer to a center of the central protrusion portion 31 in the plan view, without cutting the outside ridgeline X8 which is formed by providing the step portion 27a at the position further from the center of the central protrusion portion 31 (see FIGS. 9 and 11). According to this structure, the rigidity of the outside frame portion 3 (the portion of the frame-shaped groove 30) of the inner panel 26 (the frame rigidity) can be ensured, providing the easy deformation for properly absorbing the impact load.

Moreover, the striker 71 which is to be engaged with the vehicle-body side is provided at the front portion of the inner panel 26, at the front slant face 31h of the inner panel 26 which is located rearward of the striker attachment portion 72 are provided the stiffener protrusion-shaped joint portions 35 as a stiffener joint portion and the first opening portions 43 which are provided at the both ends in the vehicle width direction and configured to cut the upper ridgeline X5 of the front slant face 31h, and the second opening portions 45 are provided at the portions of the front slant face 31h which are located between the first opening portions 43 and the stiffener protrusion-shaped joint portions 35 such that the second opening portions 45 are located downward apart from the upper ridgeline X5 (see FIGS. 2, 3, 6, 8 and 9). According to this embodiment, since the second opening portion 45 which is provided at the front slant face 31h is located downward apart from the upper ridgeline X5, the stiffener 60 can be supported so as to endure a closing load of the bonnet 10, and the front slant face 31h can be made to have a load-absorption deformation in the collision-object's collision by the first opening portion 43 and the second opening portion 45.

Further, the second opening portion 45 and the stiffener protrusion-shaped joint portion 35 are aligned in the vehicle width direction (see FIGS. 2, 3, 6, 8, 9 and 10). According to this structure, since the second opening portion 45 provided at the portion of the front slant face 31h which is located downward apart from the upper ridgeline X5 is located at the same level as the stiffener protrusion-shaped joint portions 35 in the front slant face 31h, the holding deformation of the front slant face 31h in the collision-object's collision can be promoted, so that the impact absorption in the collision can be attained properly.

Also, the stiffener 60 which is provided at the front portion of the inner panel 26 includes the extension portion 66 which extends in the cantilever shape in the vehicle width direction from the stiffener protrusion-shaped joint portions 35 to the position where the stiffener 60 overlaps the second opening portion 45 (see FIGS. 2, 6 and 10). According to this structure, since there is provided the extension portion 66, the number of the front leg portions 67F and the rear leg portions 67R (the leg portions) does not increase improperly, a reinforcing range of the tensile rigidity of the stiffener 66 for a bonnet-closing operation can be enlarged regardless of the shape of the second opening portion 45. Further, since the extension portion 66 is provided in the cantilever shape, it can be prevented that the reaction of the load-absorption deformation in an area where the second opening portion 45 is provided becomes too low.

Moreover, the bonnet structure comprises the striker 71 which is configured to detachably connect the front end of the bonnet 10 to the front end portion of the vehicle body 400, the striker attachment portion 72 which is provided at the upper face 26*u* of the inner panel 26 and to which the striker 71 is attached, and the stiffener 60 which is provided at the upper face of the front end portion of the inner panel 26 so as to support the outer panel 25 from below, wherein the stiffener 60 comprises the roughly flat-plate shaped body portion 65 which is provided above the striker attachment portion 72 with a specified distance, facing the striker attachment portion 72, and the front and rear leg portions 67F, 67R as a connection portion which connects the body portion 65 and the inner panel 26, which are formed integrally, the body portion 65 has the front opening holes 62 and the rear opening hole 61 which are provided to face the striker attachment portion 72 and formed side by side in the vehicle longitudinal direction, the lateral bead 63 as a lateral groove portion which is configured to protrude upward or downward and extend in the vehicle width direction between the front opening holes 62 and the rear opening hole 61, and the longitudinal beads 64 as a pair of longitudinal groove portions which are configured to respectively protrude upward or downward and extend in the vehicle longitudinal direction near the both ends, in the vehicle width direction, of the lateral bead 63, and the lateral bead 63 is formed in the curve shape such that the lateral bead 63 protrudes in the vehicle width direction in the plan view, and the longitudinal beads 64 are respectively formed in the curve shape such that the longitudinal beads 64 protrude in the vehicle width direction in the plan view (see FIGS. 2, 6 and 10).

According to this structure, both the impact absorption of the collision load applied from above and the support rigidity of the outer panel 25 can be ensured. Specifically, since the lateral and longitudinal beads 63, 64 are formed at the stiffener 60, it can be restrained that the rigidity of a portion of the stiffener 60 near the front opening holes 62 and the rear opening hole 61 decreases improperly. Further, since the lateral and longitudinal beads 63, 64 are formed respectively in the curve shape, the rigidity of the stiffener 60 can be properly improved compared to a case in which they are formed in a straight shape. Additionally, since the longitudinal beads 64 are provided near the both ends of the lateral bead 63, the portion of the stiffener 60 near the both ends, in the vehicle width direction, of the lateral bead 63 can be reinforced. Accordingly, it can be restrained that the stress concentrates on the both ends, in the vehicle width direction, of the lateral bead 63. Thus, even in a case in which the front opening holes 62 and the rear opening hole 63 which are the service holes for the striker attachment portion 72 are formed for example, the rigidity of the stiffener 60 can be ensured. Thereby, when the collision load is applied from above, it can be prevented that the stiffener 60 is depressed and completely crushed before sufficiently absorbing the collision load. Consequently, both the impact absorption of the collision load applied from above and the support rigidity of the outer panel 25 can be ensured by the curve-shaped lateral and longitudinal beads 63, 64.

Further, in a case in which the lateral bead 63 is formed in the curve shape in which the lateral bead 63 protrudes rearward, the front edge of the rear opening hole 61 is formed in the curve shape such that the front edge of the rear opening hole 61 protrudes forward, whereas in a case in which the lateral bead 63 is formed in the curve shape in which the lateral bead 63 protrudes forward, the rear edge of the front opening hole 62 is formed in the curve shape such that the rear edge of the front opening hole 62 protrudes rearward. According to this structure, the deformation of the stiffener 60 can be further restrained. Specifically, in a case in which the lateral bead 63 is formed in the curve shape in which the lateral bead 63 protrudes rearward and also the front edge of the rear opening hole 61 is formed in the curve shape such that the front edge of the rear opening hole 61 protrudes rearward, the curve shape of the lateral bead 63 and the front-edge shape of the rear opening hole 61 are roughly parallel to each other, so that the rigidity of a portion between the rear opening hole 61 and the lateral bead 63 tends to become low. Therefore, when the load is applied to this portion between the rear opening hole 61 and the lateral bead 63, the amount of displacement between the rear opening hole 61 and the lateral bead 63 becomes so large that the lateral bead 63 may have mouth-opening deformation improperly. Further, in the case in which the front edge of the rear opening hole 61 is formed in the curve shape such that the front edge of the rear opening hole 61 protrudes rearward, the curvature of both ends, in the vehicle width direction, of the front edge of the rear opening hole 61 becomes large, so that the stress may concentrate on these both ends improperly. Therefore, in the case in which the lateral bead 63 is provided close to the rear opening portion 61, the stress tends to concentrate on the both ends of the lateral bead 63 and the both ends of the front edge of the rear opening hole 61, so that there is a concern that there may occur cracks when the load is applied from above repeatedly. By contrast, in the case in which the lateral bead 63 is formed in the curve shape such that it protrudes rearward and also the front edge of the rear opening hole 61 is formed in the curve shape such that it protrudes forward, the decreasing of the rigidity of the portion of the stiffener 60 between the rear opening hole 61 and the lateral bead 63 can be restrained more properly, compared to the case in which the curve shape of the lateral bead 63 and the front-edge shape of the rear opening hole 61 are roughly parallel to each other. Moreover, since the front edge of the rear opening hole 61 is formed in the curve shape such that it protrudes forward, the curvature of the both ends of the front edge of the rear opening hole 61 can be properly small. Thereby, it can be restrained that the stress concentrates on the both ends of the front edge of the rear opening hole 61 and also the size of the rear opening hole 61 formed at the stiffener 60 can be larger. Additionally, even in a case in which the lateral bead 63 is provided close to the rear opening hole 61, the front edge of the rear opening portion 61 and the lateral bead 63 are located further away from each other on the outward side, in the vehicle width direction, of these. Thereby, it can be restrained even when the load is applied from above repeatedly that the cracks occur from the both ends of the lateral bead 63 or the both ends of the front edge in the stiffener 60. Thus, since the front edge of the rear opening hole 61 and the lateral bead 63 are formed in the curve shape, respectively, such that these protrude toward them, facing each other, the deformation of the stiffener 60 can be restrained more.

Also, the width, in the vehicle width direction, of the body portion 65 of the stiffener 60 is configured to be greater than that of the striker attachment portion 72, and the outward-side portion of the body portion 65 which is located on the outward side, in the vehicle width direction, of the longitudinal bead 64 is configured in the truss shape by the plural roughly-triangular opening holes (the first triangular opening hole 165, the second triangular opening hole 166, and the third triangular opening hole 167) (see FIGS. 2 and 10). According to this structure, the body portion 65 of the stiffener 60 can be properly lightweight, ensuring its size and rigidity which is large enough to support the outer panel 25. Further, since the edge shape of the first triangular opening hole 165 which is adjacent to the longitudinal bead 64 and the curve shape of the longitudinal bead 64 are not roughly parallel to each other, the rigidity of the portion of the body portion 65 of the stiffener 60 between the first triangular opening hole 165 and the longitudinal bead 64 can be restrained from decreasing. Accordingly, since the outward-side portion of the body portion 65 is configured in the truss shape, both the impact absorption of the collision load applied from above and the support rigidity of the outer panel 25 can be surely ensured.

The hinge of the present invention corresponds to the bonnet hinge 20 of the above-described embodiment. Likewise, the front end portion of the bonnet inner panel corresponds to the front side portion 26F of the inner panel 26, the upper and lower ridgelines of the central protrusion portion corresponds to the upper ridgeline X5 of the central protrusion portion 31 and the lower ridgeline X6 of the central protrusion portion 31, and the pair of slits correspond to the first opening portion 43 (specifically, the front-side first opening portion 43F and the rear-side first opening portion 43R). Further, the inside ridgeline formed by providing the step portion corresponds to the step-portion inside ridgeline X7, whereas the outside ridgeline formed by providing the step portion corresponds to the step-portion outside ridgeline X8. Moreover, the lock portion corresponds to the striker reinforcement 50 which is engaged with the vehicle-body side via the striker 71, the reinforcement portion corresponds to the deep-drawn groove 33, the first vertical wall corresponds to the side slant faces 31j, 31k of the central protrusion portion 31, the stiffener joint portion corresponds to the stiffener protrusion-shaped joint portion 35, the connection portion corresponds to the front leg portion 47F and the rear leg portion 47R, the lateral groove portion corresponds to the lateral bead 63, the longitudinal groove portion corresponds to the longitudinal bead 64, and the plural triangular opening holes correspond to the first triangular opening hole 469, the second triangular hole 470, and the third triangular opening hole 471. The present invention should not be limited to the above-described embodiment, and any other modifications or improvements may be applied within the scope of a spirit of the present invention.

What is claimed is:

1. A bonnet structure of an automotive vehicle, in which a rear portion of a bonnet including a bonnet outer panel and a bonnet inner panel is pivotally supported at a vehicle body via a hinge,
    wherein said bonnet inner panel includes a central protrusion portion protruding upward in a vehicle elevational view and a rear protrusion portion located in back of the central protrusion portion, which are arranged side by side in a vehicle longitudinal direction, a deep-drawn groove is provided between the central protrusion portion and the rear protrusion portion to extend in a vehicle width direction, and a hinge reinforcement is provided to extend from a position beside the rear protrusion portion to a position at a rear end of the central protrusion portion, passing through beside the deep-drawn groove, and
    wherein said deep-drawn groove curves such that a central portion, in the vehicle width direction, thereof protrudes forward, in a plan view, to a position forward of a front end of said hinge reinforcement.

2. The bonnet structure of the automotive vehicle of claim 1, wherein a pair of said side grooves depressed downward are provided to extend in the vehicle longitudinal direction at both right-and-left side portions of said bonnet inner panel, and said hinge reinforcement is fixed to a portion of the bonnet inner panel beside said side groove at a level located below said deep-drawn groove.

3. The bonnet structure of the automotive vehicle of claim 1, wherein a lock portion to be engaged with a vehicle-body side is provided at a front portion of the bonnet, a ridge-holding starting point to promote an upward bending is provided at a portion of said bonnet inner panel between said lock portion and said hinge reinforcement, and a reinforcement portion which is configured to extend in the vehicle width direction and deform downward when receiving an input load greater than a longitudinal-direction proof stress thereof and a front end of the hinge reinforcement are arranged side by side in the vehicle width direction at a position rearward of said ridge-holding starting point.

4. The bonnet structure of the automotive vehicle of claim 3, wherein said reinforcement portion is formed by said deep-drawn groove, and said hinge reinforcement extends to a position at a front edge of the deep-drawn groove.

5. The bonnet structure of the automotive vehicle of claim 3, wherein a rear slant face which is configured to slant forward and upward relative to a lower face of a portion of said bonnet inner panel which is located forward of said central protrusion portion is provided at said central protrusion portion, and said front end of the hinge reinforcement is provided at a position which is located forward of a lower edge of said rear slant face and beside or rearward of an upper edge of the rear slant face in the vehicle longitudinal direction.

6. The bonnet structure of the automotive vehicle of claim 3, wherein a frontal-collision load transmission path is provided to extend in the vehicle longitudinal direction at a level located above said hinge reinforcement relative to said reinforcement portion.

7. The bonnet structure of the automotive vehicle of claim 3, wherein said ridge-holding starting point comprises a depression portion which is depressed upward from a lower face of the bonnet inner panel and a first vertical wall which extends upward from said depression portion, and said reinforcement portion is formed by said deep-drawn groove and comprises a recess portion which is recessed downward from an upper face of the bonnet inner panel and a second vertical wall which extends downward from said recess portion.

8. The bonnet structure of the automotive vehicle of claim 1, wherein a striker to be engaged with a vehicle-body side is provided at a front portion of the bonnet, a frame-shaped groove which encloses a front side and right and left sides of three portions of said central protrusion portion, said rear protrusion portion, and said deep-drawn groove in a U shape and has a deeper depth than the deep-drawn groove is provided at said bonnet inner panel, and a stiffener is spaced upward apart from a striker attachment portion and provided to extend between a front slant face of the central protrusion portion and a front end portion of the bonnet inner panel.

9. The bonnet structure of the automotive vehicle of claim 8, wherein a striker reinforcement of said striker is provided to extend between both sides of said frame-shaped groove at a forward position of said central protrusion portion, being spaced downward apart from said stiffener by a specified distance which is greater than a protrusion height of a rear portion of said central protrusion portion.

10. The bonnet structure of the automotive vehicle of claim 8, wherein a pair of slits configured to cut upper and lower ridgelines of said central protrusion portion and a pole-shaped portion interposed between the pair of slits are provided at a front-side corner portion of the central protrusion portion.

11. The bonnet structure of the automotive vehicle of claim 10, wherein a step portion is provided at the forward position of said central protrusion portion, and said slit is configured to cut an inside ridgeline which is formed by providing said step portion at a position closer to a center of the central protrusion portion in a plan view, without cutting an outside ridgeline which is formed by providing the step portion at a position further from the center of the central protrusion portion.

12. The bonnet structure of the automotive vehicle of claim 1, wherein a striker to be engaged with a vehicle-body side is provided at a front portion of said bonnet inner panel, at a front slant face of the bonnet inner panel which is located rearward of a striker attachment portion are provided a stiffener joint portion and a pair of first opening portions which are provided at both ends in the vehicle width direction and configured to cut an upper ridgeline of said front slant face, and a second opening portion is provided at a portion of said front slant face which is located between said first opening portion and said stiffener joint portion such that the second opening portion is located downward apart from said upper ridgeline.

13. The bonnet structure of the automotive vehicle of claim 12, wherein said second opening portion and said stiffener joint portion are aligned in the vehicle width direction.

14. The bonnet structure of the automotive vehicle of claim 12, wherein a stiffener provided at said front portion of the bonnet inner panel includes an extension portion which extends in a cantilever shape in the vehicle width direction from said stiffener joint portion to a position where the stiffener overlaps said second opening portion.

15. The bonnet structure of the automotive vehicle of claim 1, further comprising a striker which is configured to detachably connect a front end of the bonnet to a front end portion of the vehicle body, a striker attachment portion which is provided at an upper face of said bonnet inner panel and to which said striker is attached, and a stiffener which is provided at an upper face of a front end portion of the bonnet inner panel so as to support said bonnet outer panel from below,
wherein said stiffener comprises a roughly flat-plate shaped stiffener body portion which is provided above said striker attachment portion with a specified distance, facing the striker attachment portion, and a connection portion which connects said stiffener body portion and the bonnet inner panel, which are formed integrally,
said stiffener body portion has a front opening hole and a rear opening hole which are provided to face the striker attachment portion and formed side by side in the vehicle longitudinal direction, a lateral groove portion which is configured to protrude upward or downward and extend in the vehicle width direction between said front opening hole and said rear opening hole, and a pair of longitudinal groove portions which are configured to respectively protrude upward or downward and extend in the vehicle longitudinal direction near both ends, in the vehicle width direction, of said lateral groove portion, and
said lateral groove portion is formed in a curve shape such that the lateral groove portion protrudes in the vehicle longitudinal direction in a plan view, and said longitudinal groove portion is formed in a curve shape such that the longitudinal groove portion protrudes in the vehicle width direction in the plan view.

16. The bonnet structure of the automotive vehicle of claim 15, wherein in a case in which said lateral groove portion is formed in the curve shape in which the lateral groove portion protrudes rearward, a front edge of said rear opening hole is formed in a curve shape such that the front edge of the rear opening hole protrudes forward, whereas in a case in which said lateral groove portion is formed in the curve shape in which the lateral groove portion protrudes forward, a rear edge of said front opening hole is formed in a curve shape such that the rear edge of the front opening hole protrudes rearward.

17. The bonnet structure of the automotive vehicle of claim 15, wherein a width, in the vehicle width direction, of said stiffener body portion is configured to be greater than that of said striker attachment portion, and an outward-side portion of the stiffener body portion which is located on an outward side, in the vehicle width direction, of said longitudinal groove portion is configured in a truss shape by plural roughly-triangular opening holes.

18. A bonnet structure of an automotive vehicle, in which a rear portion of a bonnet including a bonnet outer panel and a bonnet inner panel is pivotally supported at a vehicle body via a hinge,
wherein said bonnet inner panel includes a central protrusion portion protruding upward in a vehicle elevational view and a rear protrusion portion located in back of the central protrusion portion, which are arranged side by side in a vehicle longitudinal direction, a deep-drawn groove is provided between the central protrusion portion and the rear protrusion portion to extend in a vehicle width direction, and a hinge reinforcement is provided to extend from a position beside the rear protrusion portion to a position at a rear end of the central protrusion portion, passing through beside the deep-drawn groove, and
wherein a lock portion to be engaged with a vehicle-body side is provided at a front portion of the bonnet, a ridge-holding starting point to promote an upward bending is provided at a portion of said bonnet inner panel between said lock portion and said hinge reinforcement, and a reinforcement portion which is configured to extend in the vehicle width direction and deform downward when receiving an input load greater than a longitudinal-direction proof stress thereof and a front end of the hinge reinforcement are arranged side by side in the vehicle width direction at a position rearward of said ridge-holding starting point.

19. A bonnet structure of an automotive vehicle, in which a rear portion of a bonnet including a bonnet outer panel and a bonnet inner panel is pivotally supported at a vehicle body via a hinge,
wherein said bonnet inner panel includes a central protrusion portion protruding upward in a vehicle elevational view and a rear protrusion portion located in back of the central protrusion portion, which are arranged side by side in a vehicle longitudinal direction, a deep-drawn groove is provided between the central protrusion portion and the rear protrusion portion to extend in a vehicle width direction, and a hinge reinforcement is provided to extend from a position beside the rear protrusion portion to a position at a rear end of the central protrusion portion, passing through beside the deep-drawn groove, and
wherein a striker to be engaged with a vehicle-body side is provided at a front portion of the bonnet, a frame-shaped groove which encloses a front side and right and left sides of three portions of said central protrusion portion, said rear protrusion portion, and said deep-drawn groove in a U shape and has a deeper depth than the deep-drawn groove is provided at said bonnet inner panel, and a stiffener is spaced upward apart from a striker attachment portion and provided to extend between a front slant face of the central protrusion portion and a front end portion of the bonnet inner panel.

20. A bonnet structure of an automotive vehicle, in which a rear portion of a bonnet including a bonnet outer panel and a bonnet inner panel is pivotally supported at a vehicle body via a hinge, wherein said bonnet inner panel includes a central protrusion portion protruding upward in a vehicle elevational view and a rear protrusion portion located in back of the central protrusion portion, which are arranged side by side in a vehicle longitudinal direction, a deep-drawn groove is provided between the central protrusion portion and the rear protrusion portion to extend in a vehicle width direction, and a hinge reinforcement is provided to extend from a position beside the rear protrusion portion to a position at a rear end of the central protrusion portion, passing through beside the deep-drawn groove, and wherein a striker to be engaged with a vehicle-body side is provided at a front portion of said bonnet inner panel, at a front slant face of the bonnet inner panel which is located rearward of a striker attachment portion are provided a stiffener joint portion and a pair of first opening portions which are provided at both ends in the vehicle width direction and configured to cut an upper ridgeline of said front slant face, and a second opening portion is provided at a portion of said front slant face which is located between said first opening portion and said stiffener joint portion such that the second opening portion is located downward apart from said upper ridgeline.

\* \* \* \* \*